(12) United States Patent
Jinnou et al.

(10) Patent No.: US 7,297,197 B2
(45) Date of Patent: *Nov. 20, 2007

(54) INK JET INK, INK JET RECORDING METHOD, INK CARTRIDGE, RECORDING UNIT, AND INK JET RECORDING APPARATUS

(75) Inventors: Masanori Jinnou, Yokohama (JP); Shin-ichi Sato, Kawasaki (JP); Jun Yoshizawa, Tokyo (JP); Kunihiko Nakamura, Gotenba (JP); Daiji Okamura, Yokohama (JP); Tomohiro Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/620,766

(22) Filed: Jan. 8, 2007

(65) Prior Publication Data

US 2007/0125262 A1    Jun. 7, 2007

Related U.S. Application Data

(63) Continuation of application No. 11/339,648, filed on Jan. 26, 2006, which is a continuation of application No. PCT/JP2005/014251, filed on Jul. 28, 2005.

(30) Foreign Application Priority Data

Jul. 29, 2004  (JP) ............................. 2004-221831
Jul. 26, 2005  (JP) ............................. 2005-216229

(51) Int. Cl.
C09D 11/02      (2006.01)
B41J 2/01       (2006.01)

(52) U.S. Cl. ................................... 106/31.47; 347/100
(58) Field of Classification Search ............. 106/31.47; 347/100
See application file for complete search history.

(56) References Cited

U.S. PATENT DOCUMENTS

| 4,202,870 A | 5/1980 | Weber et al. ................ 423/630 |
| 4,242,271 A | 12/1980 | Weber et al. ......... 260/448 AD |
| 4,248,852 A | 2/1981 | Wabayashi et al. ......... 423/626 |
| 4,723,129 A | 2/1988 | Endo et al. .................. 346/1.1 |
| 4,740,796 A | 4/1988 | Endo et al. .................. 346/1.1 |
| 5,091,009 A | 2/1992 | Nogami et al. .......... 106/287.1 |
| 5,123,960 A | 6/1992 | Shirota et al. ................ 106/22 |

(Continued)

FOREIGN PATENT DOCUMENTS

DE    41 19 591 A1    12/1992

(Continued)

OTHER PUBLICATIONS

English translation of JP 2004/323605, Nov. 2004.*

(Continued)

*Primary Examiner*—Helene Klemanski
(74) *Attorney, Agent, or Firm*—Fitzpatrick, Cella, Harper & Scinto

(57) ABSTRACT

An ink jet ink is provided with which metallic luster appearing in printing on a recording medium, i.e. the bronze phenomenon is kept from occurring and good images can be obtained. The ink jet ink includes at least a coloring material which is a compound represented by a specific general formula, and further contains a specific amine compound.

15 Claims, 9 Drawing Sheets

U.S. PATENT DOCUMENTS

| | | | |
|---|---|---|---|
| 5,221,497 A | 6/1993 | Watanabe et al. | 252/313.2 |
| 5,254,159 A | 10/1993 | Gundlach et al. | 106/31.43 |
| 5,395,434 A | 3/1995 | Tochihara et al. | 106/22 R |
| 5,415,686 A | 5/1995 | Kurabayashi et al. | 106/26 R |
| 5,451,251 A | 9/1995 | Mafune et al. | 106/22 H |
| 5,462,590 A | 10/1995 | Yui et al. | 106/31.43 |
| 5,482,545 A | 1/1996 | Aoki et al. | 106/22 K |
| 5,485,188 A | 1/1996 | Tochihara et al. | 347/100 |
| 5,835,116 A | 11/1998 | Sato et al. | 347/98 |
| 5,882,360 A | 3/1999 | Bauer et al. | 8/661 |
| 5,933,164 A | 8/1999 | Sato et al. | 347/43 |
| 5,980,623 A | 11/1999 | Hiraoka et al. | 106/31.49 |
| 6,003,987 A | 12/1999 | Yamamoto et al. | 347/100 |
| 6,027,210 A | 2/2000 | Kurabayashi et al. | 347/100 |
| 6,048,390 A | 4/2000 | Yano et al. | 106/31.43 |
| 6,102,997 A | 8/2000 | Helling et al. | 106/31.43 |
| 6,186,615 B1 | 2/2001 | Sato et al. | 347/43 |
| 6,238,045 B1 | 5/2001 | Ono et al. | 347/96 |
| 6,322,209 B1 | 11/2001 | Sato et al. | 347/105 |
| 6,379,441 B1 | 4/2002 | Kanaya et al. | 106/31.49 |
| 6,460,987 B1 | 10/2002 | Katsuragi et al. | 347/100 |
| 6,511,534 B1 | 1/2003 | Mishina et al. | 106/31.33 |
| 6,569,212 B2 | 5/2003 | Carr | 8/445 |
| 6,682,590 B2 | 1/2004 | Omatsu et al. | 106/31.5 |
| 6,698,876 B2 | 3/2004 | Sato et al. | 347/100 |
| 6,758,889 B2 | 7/2004 | Koga et al. | 106/31.43 |
| 6,827,771 B2 | 12/2004 | Omatsu et al. | 106/31.49 |
| 6,976,755 B2 | 12/2005 | Sato et al. | 347/100 |
| 7,087,107 B2 | 8/2006 | Tateishi et al. | 106/31.49 |
| 7,160,372 B2 * | 1/2007 | Yoshizawa et al. | 106/31.47 |
| 2002/0005884 A1 | 1/2002 | Onishi et al. | 347/100 |
| 2002/0096082 A1 | 7/2002 | Omatsu et al. | 106/31.5 |
| 2003/0196569 A1 * | 10/2003 | Yatake et al. | 106/31.58 |
| 2005/0005818 A1 | 1/2005 | Sato et al. | 106/31.27 |
| 2005/0131104 A1 | 6/2005 | Aikawa et al. | 523/160 |
| 2006/0102046 A1 | 5/2006 | Okamura et al. | 106/31.47 |
| 2006/0102047 A1 | 5/2006 | Yoshizawa et al. | 106/31.47 |
| 2006/0102048 A1 | 5/2006 | Nakamura et al. | 106/31.52 |
| 2006/0103705 A1 | 5/2006 | Yoshizawa et al. | 347/100 |
| 2006/0103706 A1 | 5/2006 | Aikawa et al. | 347/100 |
| 2006/0109324 A1 | 5/2006 | Fujimoto et al. | 347/100 |
| 2006/0119682 A1 | 6/2006 | Okamura et al. | 374/100 |
| 2006/0119683 A1 | 6/2006 | Yoshizawa et al. | 347/100 |
| 2006/0119684 A1 | 6/2006 | Mafune et al. | 347/100 |
| 2006/0119685 A1 | 6/2006 | Yamashita et al. | 347/100 |
| 2006/0124027 A1 | 6/2006 | Sato | 106/31.6 |
| 2006/0137570 A1 | 6/2006 | Osumi et al. | 106/31.27 |
| 2006/0146108 A1 | 7/2006 | Sato et al. | 347/100 |
| 2006/0152569 A1 * | 7/2006 | Jinnou et al. | 347/105 |
| 2006/0156952 A1 | 7/2006 | Takayama et al. | 106/31.52 |
| 2006/0201383 A1 | 9/2006 | Moffatt et al. | 106/31.43 |

FOREIGN PATENT DOCUMENTS

| | | |
|---|---|---|
| JP | 57-198758 | 6/1982 |
| JP | 57-44605 B2 | 9/1982 |
| JP | 61-87759 | 5/1986 |
| JP | 3-185080 | 8/1991 |
| JP | 2002-249677 | 9/1992 |
| JP | 5-171085 | 7/1993 |
| JP | 10-130517 | 5/1998 |
| JP | 2803134 B2 | 7/1998 |
| JP | 11-29729 | 2/1999 |
| JP | 2881847 B2 | 2/1999 |
| JP | 2942319 | 6/1999 |
| JP | 2000-303009 | 10/2000 |
| JP | 2001-323196 | 11/2001 |
| JP | 2003-238851 | 8/2003 |
| JP | 2004-323605 | 11/2004 |

OTHER PUBLICATIONS

English translation of JP 2004/323605 (Nov. 2004).

* cited by examiner

INK JET INK, INK JET RECORDING METHOD, INK CARTRIDGE, RECORDING UNIT, AND INK JET RECORDING APPARATUS

This application is a continuation of application Ser. No. 11/339,648 filed Jan. 26, 2006, which is a continuation of International Application No. PCT/JP2005/014251 filed on Jul. 28, 2005, which claims the benefit of Japanese Patent Application No. 2004-221831 filed on Jul. 29, 2004, and No. 2005-216229 filed on Jul. 26, 2005.

BACKGROUND OF THE INVENTION

1. Field of the Invention

The present invention relates to an ink jet ink which has high environmental gas resistance and provides good images in which the occurrence of metallic luster, the so-called bronze phenomenon, is suppressed even when the ink is printed on a recording medium. The present invention also relates to an ink jet recording method, an ink cartridge, a recording unit, and an ink jet recording apparatus each using the ink jet ink.

2. Related Background Art

An ink jet recording method is a recording method of applying a small ink droplet to any one of recording media such as plain paper and glossy media to form an image, and has become rapidly widespread owing to reduction in costs and improvement in recording rate. With the rapid spread of digital cameras in addition to improvement in the quality of images recorded by the method, the method has been generally used as a method of outputting photographic images comparable to silver halide photographs.

In recent years, image quality has undergone improvement more than ever owing to, for example, extreme reduction in size of an ink droplet and an improvement of the color gamut involved in the introduction of multi-color inks. Meanwhile, there have been growing demands for coloring materials and inks, and stricter properties have been required in respect of improvement of color developability and reliability concerning anti-clogging or ejection stability.

As compared with the silver halide photograph, the ink jet recording method is problematic in respect of, for example, the image storage stability of the resultant recorded product. In general, the recorded product obtained by the ink jet recording method is inferior in image storage stability to that by the silver halide photograph, and involves the emergence of a problem in that a coloring material on the recorded product is apt to deteriorate to cause a change in the color tone of the image and the color fading of the image when the recorded product is exposed to light, heat, environmental gases present in the air, or the like for a long period of time. In particular, the enhancement of environmental gas resistance to the level of silver halide photographs has been of a concern from the past in the ink jet recording method. Cyan has the lowest environmental gas resistance among yellow, magenta, and cyan, which are hues used for ink jet ink. Therefore, the enhancement of the environmental gas resistance of cyan ink to the level comparable to that of yellow ink or magenta ink is of one important concern in the ink jet recording method.

The basic skeletons of coloring materials for ink jet ink having a cyan hue are roughly classified into a phthalocyanine skeleton and a triphenylmethane skeleton. Representative coloring materials of the former include C.I. Direct Blue 86 and 87, and C.I. Direct Blue 199. Representative coloring materials of the latter include C.I. Acid Blue 9.

In general, a phthalocyanine-based coloring material is characterized in that it is excellent in light resistance as compared with a triphenylmethane-based coloring material. Furthermore, the phthalocyanine-based coloring material has high fastness properties against humidity or heat and has good color developability, and so the coloring material has been widely used as a coloring material for ink jet ink.

However, the phthalocyanine-based coloring material tends to be poor in fastness against environmental gases in the air (such as ozone, $No_x$, or $SO_2$), especially an ozone gas. In particular, in a recorded product obtained by applying the coloring material on a recording medium having an ink-receiving layer containing an inorganic substance such as alumina or silica, the fastness is significantly low, hence the color fading of the recorded product is remarkable when the recorded product is left standing in a room for a long period of time. Various compounds to be added to ink have been disclosed for the purpose of improving the environmental gas resistance (see, for example, Japanese Patent Application Laid-Open No. H05-171085, Japanese Patent Application Laid-Open No. H11-29729, Japanese Patent Application Laid-Open No. H10-130517, Japanese Patent Application Laid-Open No. 2000-303009, and Japanese Patent Application Laid-Open No. 2002-249677). However, none of those publications has achieved the compatibility between good color developability and-high environmental gas resistance for ink jet ink.

The phthalocyanine-based coloring material involves another problem, that is, the occurrence of metallic luster resulting from the high aggregation properties of the coloring material, the so-called bronze phenomenon. When the bronze phenomenon occurs in a recorded product, the optical reflection properties of the recorded product change. As a result, the color developability and hue of an image remarkably change, with the result that the image quality is significantly lowered. The bronze phenomenon is considered to occur as a result of the aggregation of the coloring material on the surface of a recording medium due to, for example, the high aggregation properties of the coloring material in ink and a lowering in permeability of the-ink into the recording medium when the ink is applied to the recording medium in particular, a coloring material with an amino group introduced in its molecule for the purpose of improving environmental gas resistance, or an ink containing a coloring material having low solubility in water tends to significantly cause the bronze phenomenon.

For example, it has been proposed that a specific phthalocyanine-based coloring material is used to improve the environmental gas resistance (see, for example, Japanese Patent No. 2942319). The use of the specific phthalocyanine-based coloring material provides the environmental gas resistance which is of one concern in the phthalocyanine-based coloring material. However, in the proposition, there is no reference to the bronze phenomenon, and hence, resistance to the bronze phenomenon of the coloring material is unclear. In other words, the compatibility between resistance to bronze phenomenon (bronze resistance) and environmental gas resistance has not yet been achieved.

Therefore, it is indispensable to conduct research on ink jet ink using a phthalocyanine-based coloring material which is excellent in color developability, has high environmental gas resistance, and suppresses the occurrence of the bronze phenomenon.

SUMMARY OF THE INVENTION

The inventors have conducted research on the compounds represented by the under-mentioned general formula (I) and salts thereof which are high in environmental gas resistance, and found that the bronze phenomenon occurs according to the rate of substituents bonded to the phthalocyanine skeleton in some cases.

Therefore, an object of the present invention is to provide an ink jet ink with which metallic luster appearing in printing on a recording medium, i.e. the bronze phenomenon is kept from occurring and good images can be obtained.

Another object of the present invention is to provide a recording method, a recording unit, an ink cartridge, and an ink jet recording apparatus each using the ink jet ink.

The above objects are achieved by the present invention described below. That is, according to one aspect of the present invention, an ink jet ink comprising at least a coloring material is provided in which the coloring material is a compound represented by the following general formula (I) or a salt thereof, and in which the ink further comprises an amino compound represented by the following general formula (II):

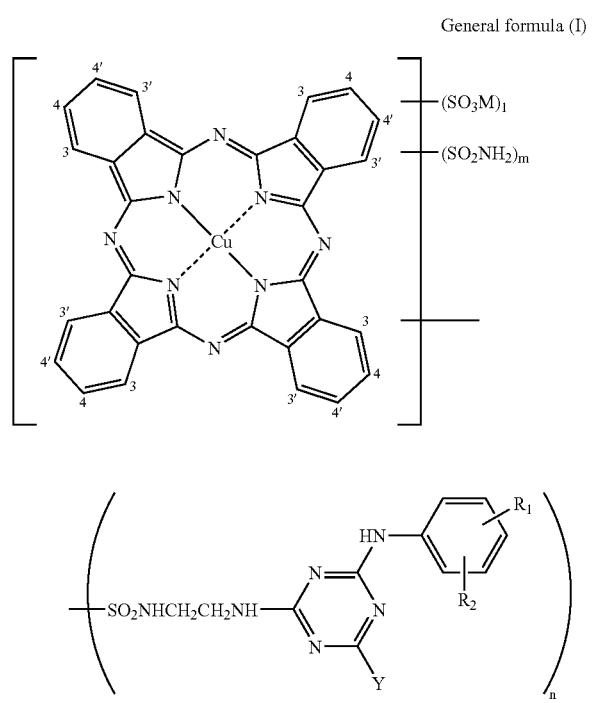

General formula (I)

(wherein M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which the substituents are present are the 4- or 4'-positions).

$$NR_1R_2R_3 \qquad \text{General Formula (II)}$$

(wherein $R_1$, $R_2$ and $R_3$ each independently represent a hydrogen atom, an alkyl group, a lower hydroxyalkyl group, a cyclohexyl group, a mono- or di-alkylaminoalkyl group, a lower cyanoalkyl group, or a phenyl group which may be substituted, provided that all of $R_1$, $R_2$ and $R_3$ are not simultaneously a hydrogen atom).

According to another aspect of the present invention, an ink jet recording method is provided including ejecting an ink by an ink jet method to perform recording on a recording medium, in which the ink is the above-described ink jet ink.

According to another aspect of the present invention, an ink cartridge is provided including an ink storage portion for storing an ink, in which the ink is the above-described ink jet ink.

According to another aspect of the present invention, a recording unit is provided including an ink storage portion for storing an ink and a recording head for ejecting the ink, in which the ink is the above-described ink jet ink.

According to another aspect of the present invention, an ink jet recording apparatus is provided including an ink storage portion for storing an ink and a recording head for ejecting the ink, in which the ink is the above-described ink jet ink.

According to the present invention, an ink jet ink can be provided which is excellent in color developability, has high environmental gas resistance, and is capable of providing an image excellent in bronze resistance.

According to the present invention, an ink jet recording method, an ink cartridge, a recording unit, and an ink jet recording apparatus each using the ink jet ink can be provided.

DESCRIPTION OF THE PREFERRED EMBODIMENTS

Figure 1:
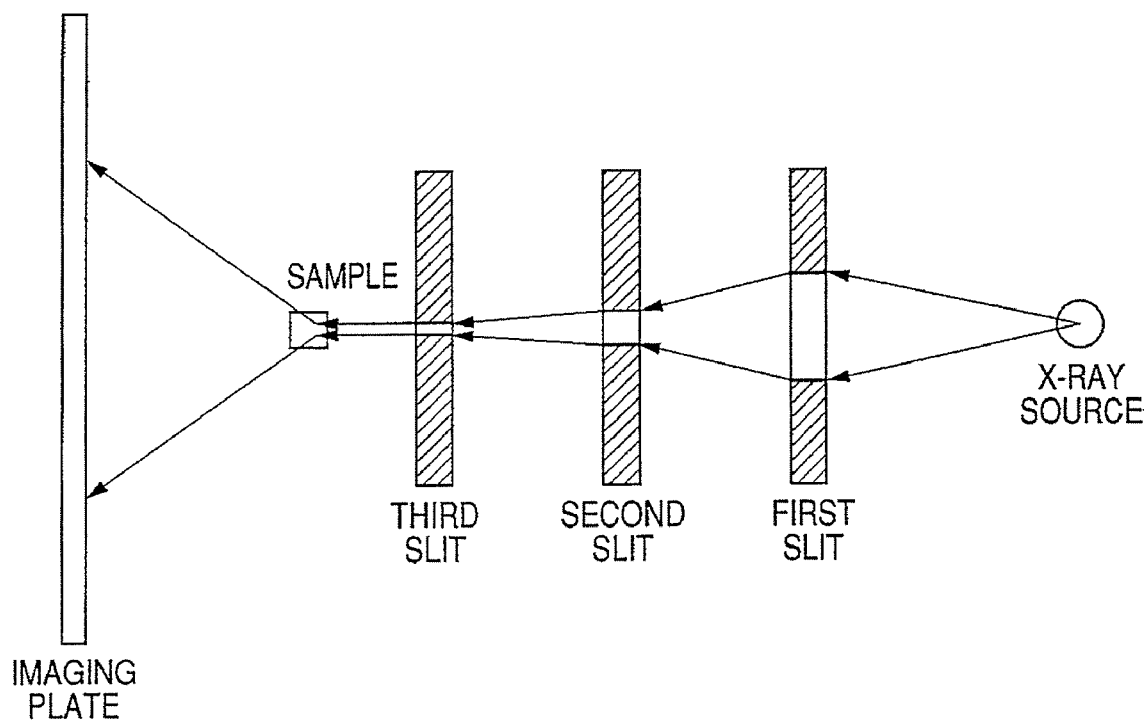
FIG. 1 is a view showing the measurement principle of a small-angle X-ray scattering method.

Hereinafter, the present invention will be described in more detail by way of preferred embodiments.

In the present invention, when a coloring material is a salt, the salt is dissociated into ions in ink, but this state is represented by using the phrase "containing a salt" for convenience.

<Ink>

Hereinafter, components constituting the ink jet ink according to the present invention (hereinafter also referred to simply as "ink") and the like will be described in detail.

With an ink in which the compound represented by the above formula (I) or a salt thereof is contained in an amount of more than 3.0 mass % based on the total mass of the ink, the bronze phenomenon is apt to occur. In particular, when the under-mentioned $d_{75}$ value exceeds 7.50 nm, the bronze phenomenon conspicuously occurs in some cases. In addition, in an ink in which the compound represented by the above formula (I) or a salt thereof is contained in an amount of more than 0.5 mass % and less than 3.0 mass % based on the whole mass of the ink, when the $d_{75}$ value exceeds 10.60 nm, the bronze phenomenon occurs in some cases. Upon finding such problems as mentioned above, the present inventors have come to make the present invention under the recognition that it is necessary to prevent the bronze phenomenon.

(Coloring Material)

The ink according to the present invention must contain a compound represented by the following general formula (I) or a salt thereof. The compound represented by the following general formula (I) or the salt thereof is a phthalocyanine derivative characterized in that it has a cyan hue and is excellent in environmental gas resistance.

General formula (I)

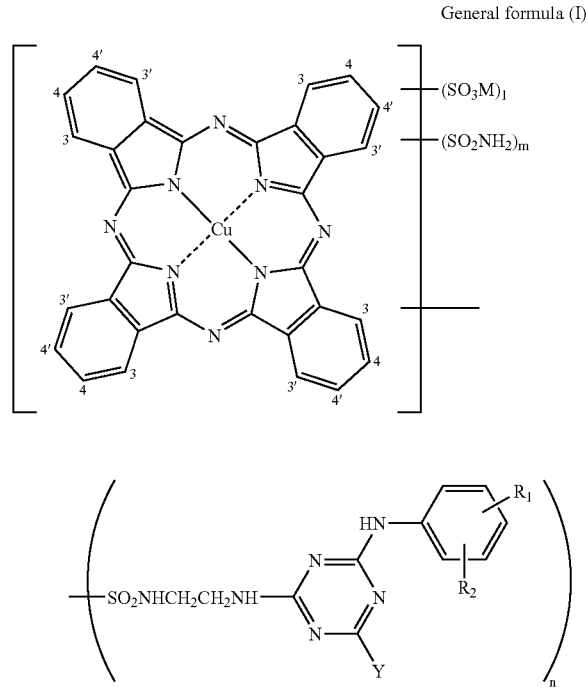

(In the general formula (I), M represents an alkali metal or ammonium; $R_1$ and $R_2$ each independently represent a hydrogen atom, a sulfonic group, or a carboxyl group (provided that $R_1$ and $R_2$ are not simultaneously a hydrogen atom); Y represents a chlorine atom, a hydroxyl group, an amino group, or a monoalkylamino or dialkylamino group; l represents 0 to 2, m represents 1 to 3, and n represents 1 to 3 (provided that l+m+n=3 to 4); and positions at which the substituents are present are the 4- or 4'-positions).

In general, when a phthalocyanine derivative is synthesized, it often inevitably includes substitution position isomers which are different in positions at which substituents $R_n$ (n: 1 to 16) in the general formula (IV) (positions of carbon atoms on the benzene rings to which $R_1$ to $R_{16}$ are bonded are defined as 1-position to 16-position, respectively) are present. However, in general, the substitution position isomers are not distinguished from one another, and are often regarded as the same derivative.

General formula (IV)

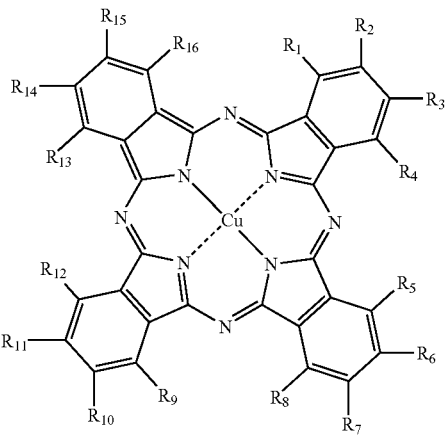

The coloring material used in the present invention is a phthalocyanine derivative obtained by selectively introducing a sulfonic group, an unsubstituted sulfamoyl group ($-SO_2NH_2$) or a substituted sulfamoyl group (a group represented by the general formula (V)) to 4-positions and 4'-positions in the general formula (I) ($R_2$, $R_3$, $R_6$, $R_7$, $R_{10}$, $R_{11}$, $R_{14}$, and $R_{15}$ in the under-mentioned general formula (IV)) so that the number of substituents is 3 to 4. The inventors of the present invention have found that a recorded product obtained by means of an ink containing such a compound is extremely excellent in environmental gas resistance.

The compound represented by the general formula (I) or the salt thereof used in the present invention is synthesized by using, as a raw material, a phthalocyanine compound obtained by reacting a 4-sulfophthalic acid derivative, or a 4-sulfophthalic acid derivative and a phthalic(anhydride) derivative, in the presence of a metal compound. The compound or the salt thereof is obtained by converting a sulfonic group in the phthalocyanine compound into a chlorosulfonic group which is then allowed to react with an aminating agent in the presence of an organic amine.

General formula (V)

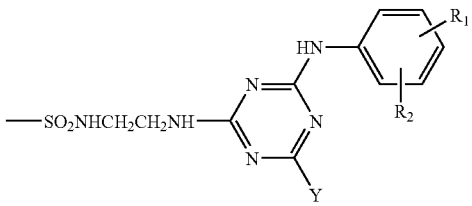

Preferable examples of the substituted sulfamoyl group represented by the general formula (V) are shown below. The substituted sulfamoyl group used in the present invention is not limited to them. The substituted sulfamoyl group represented by the general formula (V) is shown in the form of a free acid.

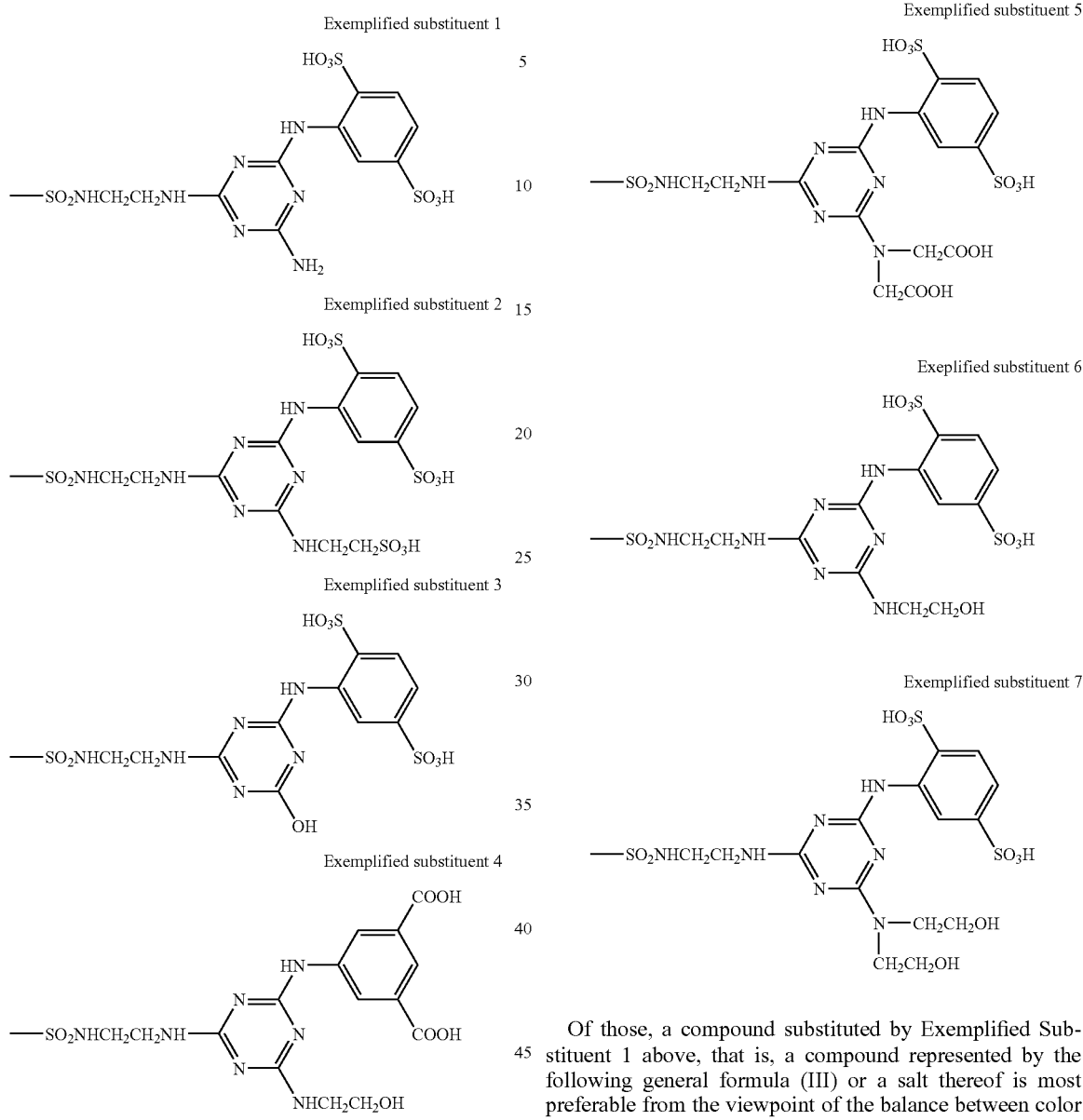
Of those, a compound substituted by Exemplified Substituent 1 above, that is, a compound represented by the following general formula (III) or a salt thereof is most preferable from the viewpoint of the balance between color developability and environmental gas resistance.
General formula (III)
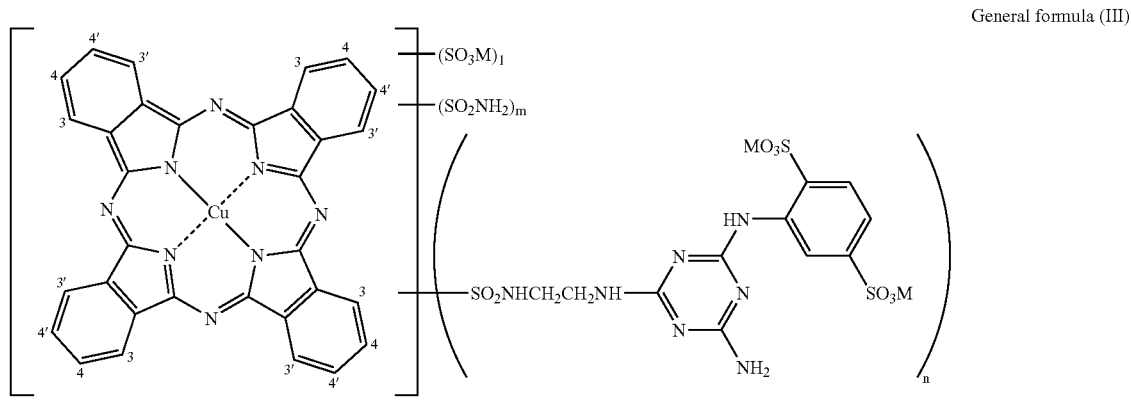

(In the general formula (III), M represents an alkali metal or ammonium; l represents 0 to 2, m represents 1 to 3, and n represents 1 to 3 (provided that l+m+n=3 to 4); and positions at which the substituents are present are the 4- or 4'-positions.)

However, even in such a compound as represented by the general formula (I) used in the present invention in which the number of substituents is 3 to 4, that is, l+m+n=3 to 4 and the substitution positions are limited to the 4- or 4'-positions, a large number of isomers are present as shown in Tables 1 and 2 below, which are different from each other in the number of each of a sulfonic group ($-SO_3M$), an unsubstituted sulfamoyl group ($-SO_2NH_2$), and a substituted sulfamoyl group (a group represented by the general formula (V)), each of which is a substituent with which the phthalocyanine skeleton is substituted. The compound represented by the general formula (I) or the salt thereof is a mixture of those isomers, and it has been confirmed that even compounds having the same structure are greatly different in their properties depending on the number and kinds of isomers. A difference in aggregation properties between coloring materials may be cited as one example of the properties.

TABLE 1

The number of substituents, the positions of substituents, and the kinds of isomers (where l + m + n = 4)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| L, m, n = 0, 1, 3 | 0 | 0 | 1 | 0 | 3 | 0 |
| | 0 | 0 | 1 | 0 | 2 | 1 |
| | 0 | 0 | 1 | 0 | 1 | 2 |
| | 0 | 0 | 1 | 0 | 0 | 3 |
| | 0 | 0 | 0 | 1 | 3 | 0 |
| | 0 | 0 | 0 | 1 | 2 | 1 |
| | 0 | 0 | 0 | 1 | 1 | 2 |
| | 0 | 0 | 0 | 1 | 0 | 3 |
| L, m, n = 0, 2, 2 | 0 | 0 | 2 | 0 | 2 | 0 |
| | 0 | 0 | 2 | 0 | 1 | 1 |
| | 0 | 0 | 2 | 0 | 0 | 2 |
| | 0 | 0 | 1 | 1 | 2 | 0 |
| | 0 | 0 | 1 | 1 | 1 | 1 |
| | 0 | 0 | 1 | 1 | 0 | 2 |
| | 0 | 0 | 0 | 2 | 2 | 0 |
| | 0 | 0 | 0 | 2 | 1 | 1 |
| | 0 | 0 | 0 | 2 | 0 | 2 |
| L, m, n = 0, 3, 1 | 0 | 0 | 3 | 0 | 1 | 0 |
| | 0 | 0 | 3 | 0 | 0 | 1 |
| | 0 | 0 | 2 | 1 | 1 | 0 |
| | 0 | 0 | 2 | 1 | 0 | 1 |
| | 0 | 0 | 1 | 2 | 0 | 1 |
| | 0 | 0 | 1 | 2 | 1 | 0 |
| | 0 | 0 | 0 | 3 | 0 | 1 |
| | 0 | 0 | 0 | 3 | 1 | 0 |
| L, m, n = 1, 1, 2 | 1 | 0 | 1 | 0 | 2 | 0 |
| | 1 | 0 | 1 | 0 | 1 | 1 |
| | 1 | 0 | 1 | 0 | 0 | 2 |
| | 1 | 0 | 0 | 1 | 2 | 0 |
| | 1 | 0 | 0 | 1 | 1 | 1 |
| | 1 | 0 | 0 | 1 | 0 | 2 |
| | 0 | 1 | 1 | 0 | 2 | 0 |
| | 0 | 1 | 1 | 0 | 1 | 1 |
| | 0 | 1 | 1 | 0 | 0 | 2 |
| | 0 | 1 | 0 | 1 | 2 | 0 |
| | 0 | 1 | 0 | 1 | 1 | 1 |
| | 0 | 1 | 0 | 1 | 0 | 2 |

TABLE 1-continued

The number of substituents, the positions of substituents, and the kinds of isomers (where l + m + n = 4)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| L, m, n = 1, 2, 1 | 1 | 0 | 2 | 0 | 1 | 0 |
| | 1 | 0 | 2 | 0 | 0 | 1 |
| | 1 | 0 | 1 | 1 | 1 | 0 |
| | 1 | 0 | 1 | 1 | 0 | 1 |
| | 1 | 0 | 0 | 2 | 1 | 0 |
| | 1 | 0 | 0 | 2 | 0 | 1 |
| | 0 | 1 | 2 | 0 | 1 | 0 |
| | 0 | 1 | 2 | 0 | 0 | 1 |
| | 0 | 1 | 1 | 1 | 1 | 0 |
| | 0 | 1 | 1 | 1 | 0 | 1 |
| | 0 | 1 | 0 | 2 | 1 | 0 |
| | 0 | 1 | 0 | 2 | 0 | 1 |
| L, m, n = 2, 1, 1 | 2 | 0 | 1 | 0 | 1 | 0 |
| | 2 | 0 | 1 | 0 | 0 | 1 |
| | 2 | 0 | 0 | 1 | 1 | 0 |
| | 2 | 0 | 0 | 1 | 0 | 1 |
| | 1 | 1 | 1 | 0 | 1 | 0 |
| | 1 | 1 | 1 | 0 | 0 | 1 |
| | 1 | 1 | 0 | 1 | 1 | 0 |
| | 1 | 1 | 0 | 1 | 0 | 1 |
| | 0 | 2 | 1 | 0 | 1 | 0 |
| | 0 | 2 | 1 | 0 | 0 | 1 |
| | 0 | 2 | 0 | 1 | 1 | 0 |
| | 0 | 2 | 0 | 1 | 0 | 1 |

TABLE 2

The number of substituents, the positions of substituents, and the kinds of isomers (where l + m + n = 3)

| | Sulfonic group | | Unsubstituted sulfamoyl group | | Substituted sulfamoyl group | |
|---|---|---|---|---|---|---|
| | 4 position | 4' position | 4 position | 4' position | 4 position | 4' position |
| L, m, n = 0, 1, 2 | 0 | 0 | 1 | 0 | 2 | 0 |
| | 0 | 0 | 1 | 0 | 1 | 1 |
| | 0 | 0 | 1 | 0 | 0 | 2 |
| | 0 | 0 | 0 | 1 | 2 | 0 |
| | 0 | 0 | 0 | 1 | 1 | 1 |
| | 0 | 0 | 0 | 1 | 0 | 2 |
| l, m, n = 0, 2, 1 | 0 | 0 | 2 | 0 | 1 | 0 |
| | 0 | 0 | 2 | 0 | 0 | 1 |
| | 0 | 0 | 1 | 1 | 1 | 0 |
| | 0 | 0 | 1 | 1 | 0 | 1 |
| | 0 | 0 | 0 | 2 | 1 | 0 |
| | 0 | 0 | 0 | 2 | 0 | 1 |
| l, m, n = 1, 1, 1 | 1 | 0 | 1 | 0 | 1 | 0 |
| | 1 | 0 | 1 | 0 | 0 | 1 |
| | 1 | 0 | 0 | 1 | 1 | 0 |
| | 1 | 0 | 0 | 1 | 0 | 1 |
| | 0 | 1 | 1 | 0 | 1 | 0 |
| | 0 | 1 | 1 | 0 | 0 | 1 |
| | 0 | 1 | 0 | 1 | 1 | 0 |
| | 0 | 1 | 0 | 1 | 0 | 1 |

In general, a phthalocyanine-based coloring material has higher aggregation properties than coloring materials having other structures (for example, a triphenylmethane-based, azo-based, or xanthene-based coloring material). The enhancement of the aggregation properties elevates fastness.

Meanwhile, coloring materials having high aggregation properties shows high aggregation properties also in ink. Therefore, when an image is printed on a recording medium by using such coloring materials, the bronze phenomenon tends to remarkably occur to lower image quality.

In contrast, when a coloring material has significantly low aggregation properties, the fastness properties (especially environmental gas resistance) of the coloring material deteriorate. Therefore, the recorded product obtained by using an ink containing such a coloring material may be unable to obtain image storage stability at the same level as yellow ink and magenta ink which are excellent in environmental gas resistance.

Accordingly, when the compound represented by the general formula (I) or the salt thereof is used as a coloring material, the aggregation properties of the coloring material must be controlled in such a manner that the occurrence of the bronze phenomenon can be suppressed and desired environmental gas resistance can be obtained.

Based on the afore-mentioned findings, the present inventors focused their attention on the aggregation properties of the compound represented by the general formula (I) and the salt thereof and conducted exhaustive researches. As a result, they have found that the aggregation properties of the coloring material, the compound represented by the general formula (I) and the salt thereof, can be controlled by changing kinds of its substituents, and further color developability can be improved and the bronze phenomenon can be prevented from occurring by including the amine compound represented by the general formula (II), and arrived at the present invention.

(Measurement of Aggregation Properties of Coloring Material)

A small-angle X-ray scattering method is applicable to the measurement of the aggregation properties of a coloring material used in the present invention.

As described in, for example, "Saishin Colloid Kagaku" (Latest Colloid Chemistry) (Kodansha Scientific, Fumio Kitahara and Kunio Furusawa) and "Hyomen Jotai and Colloid Jotai" (Surface State and Colloid State) (Tokyo Kagaku Dozin, Co., Ltd., Masayuki Nakagaki), the small-angle X-ray scattering method is an approach that has been generally used for calculating a distance between colloid particles in a colloidal solution.

The outline of a small-angle X-ray scattering apparatus will be described with reference to FIG. 1 showing the measurement principle of the small-angle X-ray scattering method. The focal spot size of each of X-rays generated from an X-ray source is reduced to about several millimeters during the passing of the X-rays through first to third slits, and a sample solution is irradiated with the X-rays. The X-rays with which the sample solution is irradiated are scattered by particles in the sample solution before the X-rays are detected on an imaging plate. Since the scattered X-rays interfere with each other because of an optical path difference between them, a distance d value between particles can be determined on the basis of a Bragg equation (the following expression (1)) using the resultant $\theta$ value. When particles are arranged to be equidistance, the d value determined here is considered to be a distance from the center of a particle to the center of an adjacent particle.

$$d = \lambda / 2 \sin \theta \qquad \text{Eq. (1)}$$

(In the expression (1), $\lambda$ represents the wavelength of an X-ray, d represents the distance between particles, and $\theta$ represents a scattering angle.)

Figure 2:
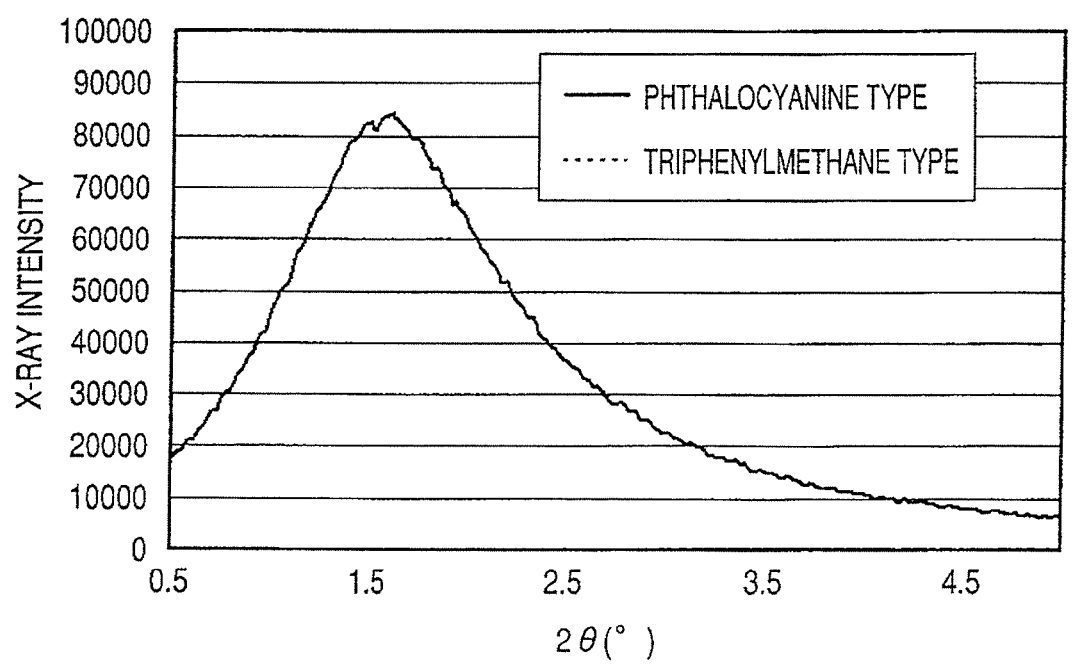
FIG. 2 is a small-angle X-ray scattering profile of each of a phthalocyanine-based coloring material and a triphenylmethane-based coloring material.

In general, no peak occurs in a scattering angle profile when particles in a solution are not regularly arranged. In the case of an aqueous solution of the coloring material (phthalocyanine-based coloring material) used in the present invention, a strong peak having the maximum value in the range of $2\theta = 0°$ to $5°$ is detected, and particles (molecular aggregates) formed by aggregation of phthalocyanine-based coloring material molecules are found to be arranged by a certain regulation. FIG. 2 shows the scattering angle profile in a 10-mass % aqueous solution of each of a triphenylmethane-based coloring material having a structure represented by Compound (1) below and a phthalocyanine-based coloring material having the structure represented by the general formula (I). FIG. 2 shows that phthalocyanine-based coloring materials specifically have scattering angle peaks even when they have the same cyan hue. In other words, several phthalocyanine molecules are aggregated in an aqueous solution of a phthalocyanine-based coloring material to form molecular aggregates. In addition, the distances between the molecular aggregates have such a constant distribution as represented by the scattering angle profile.

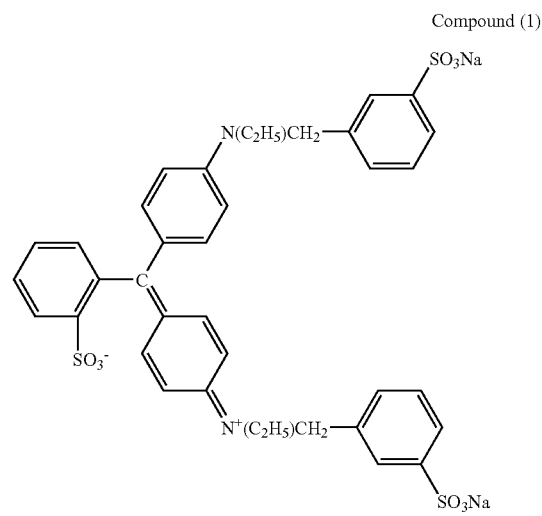

Compound (1)

Figure 3:
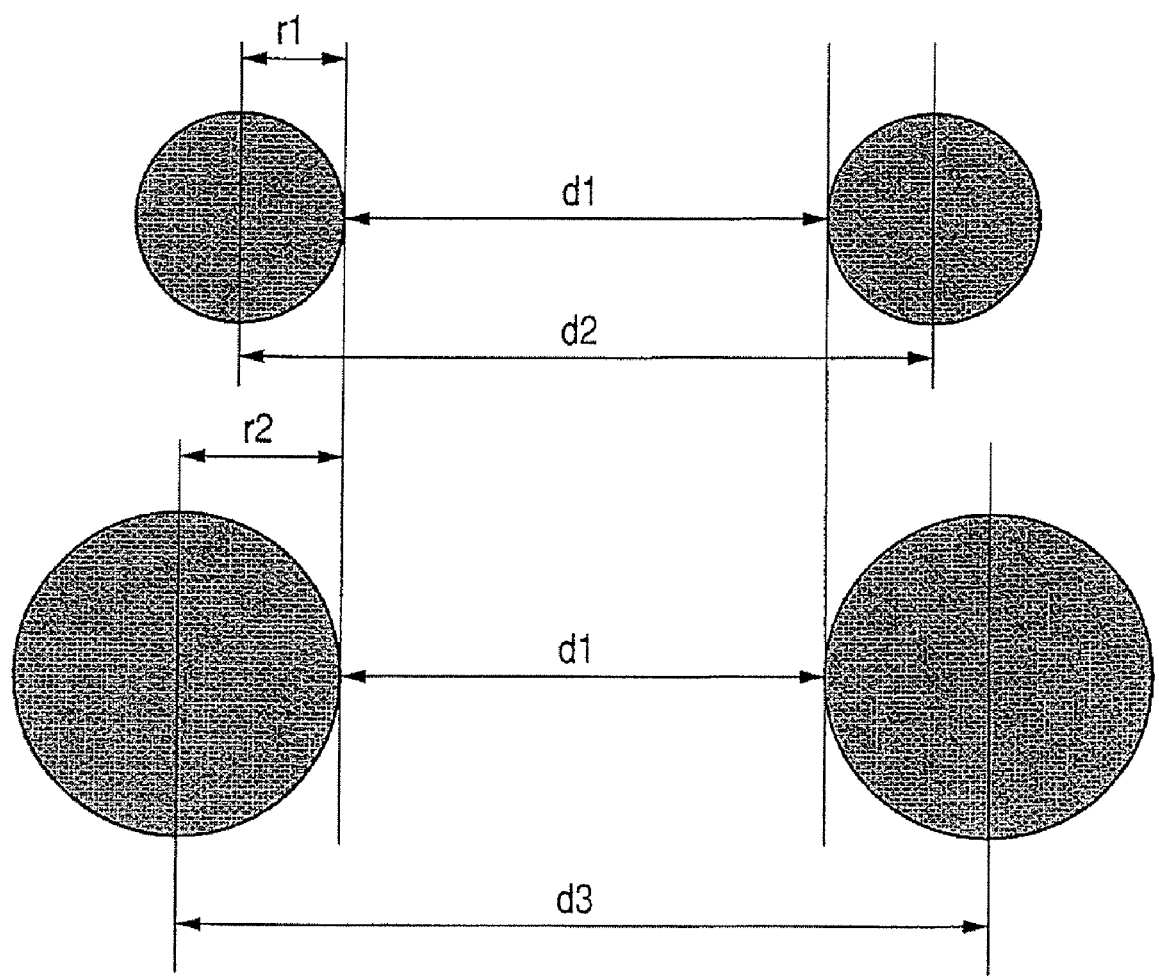
FIG. 3 is a conceptual diagram of the dispersion distance between molecular aggregates of a phthalocyanine-based coloring material.

FIG. 3 is a schematic view of the dispersion distance between molecular aggregates of a phthalocyanine-based coloring material. As shown in FIG. 3, the radius of a certain molecular aggregate of the phthalocyanine-based coloring material is denoted by r1 and the distance between molecular aggregates is denoted by d1. Assuming that d1 is always constant when the structure of the phthalocyanine-based coloring material remains unchanged, the d value measured by a small-angle X-ray scattering method is considered to increase from d2 to d3 as the radius of the molecular aggregate formed by the phthalocyanine-based coloring material increases from r1 to r2. Accordingly, the d value measured by the above method is considered to be an indication of the size of the molecular aggregate of the phthalocyanine-based coloring material, and the size of the molecular aggregate formed from coloring material molecules is considered to increase as the d value increases.

Investigation into the relationship between the d value in ink containing a phthalocyanine-based coloring material and the bronze phenomenon has revealed that in the case of phthalocyanine-based coloring materials represented by the same structural formula, the bronze phenomenon is more likely to occur as the d value is larger. Taking into consideration the fact that the bronze phenomenon occurs owing to the aggregation of coloring material molecules on a recording medium, it has been supported that there is the correlation between the d value described above and the size of a molecular aggregate.

A peak shape in a scattering angle profile indicates the distribution of the distances between molecular aggregates, that is, the distribution of the dispersion distances between the molecular aggregates. Taking into consideration the above-described fact that the dispersion distances are an indication of the sizes of molecular aggregates, such scattering angle profile is supposed to indicate the distribution of the sizes of molecular aggregates in a solution. In other words, assuming that the peak area of a scattering angle profile shows the sizes of the entire molecular aggregates in a solution, the bronze phenomenon tends to be more likely to occur as the d value is larger, that is, the frequency of large molecular aggregates is higher. Therefore, reducing the frequency of large molecular aggregates which are apt to cause the bronze phenomenon is expected to be capable of suppressing the occurrence of the bronze phenomenon. However, in the case of ink containing only significantly small molecular aggregates, the environmental gas resistance of the ink is lowered, although the bronze phenomenon is less likely to occur. Accordingly, the sizes of molecular aggregates (the absolute value of the d value) must be appropriately controlled for suppressing the occurrence of the bronze phenomenon and for obtaining environmental gas resistance.

In general, when the sizes of coloring material molecules have a certain frequency distribution, the threshold value of the visual sense which is the limit of the observability of a human being is said to be 25% of the entire amount. In view of the above, the d value at the point at which large molecular aggregates causative of the bronze phenomenon comes to account for 25% or less of the entire aggregates, i.e., the point at which small molecular aggregates which hardly cause the bronze phenomenon account for 75% or more of the entire aggregates is defined as a $d_{75}$ value and the $d_{75}$ value is so controlled as to fall within a specific range, whereby ink which suppresses the occurrence of the bronze phenomenon and has high environmental gas resistance can be obtained.

In actuality, according to investigation into the correlation between each of a $d_{peak}$ value calculated from the peak of a $2\theta$ value in a scattering angle profile and the above-described $d_{75}$ value, and the occurrence level of the bronze phenomenon, it has been found that the $d_{75}$ value in which a distribution factor of the sizes of the entire molecular aggregates is taken into account has a stronger correlation with the bronze phenomenon than the $d_{peak}$ value. A base line for determining the $2\theta$ value is drawn in the range of 0.5° to 5°.

The following experiment was carried out using compounds prepared by changing the number, kinds, and substitution positions of substituents in the compound represented by the general formula (I) or the salt thereof, which is a phthalocyanine-based coloring material, that is, coloring materials with the aggregation properties controlled. Inks containing the coloring materials were prepared, and the scattering angle profiles of the inks were measured to calculate the $d_{75}$ values. Next, the coloring materials were evaluated for the aggregation properties on the basis of their respective $d_{75}$ values. As a result, it turned out that when the $d_{75}$ value was 6.70 nm or more and 10.60 nm or less and the content of the coloring material was more than 3.0 mass % based on the total mass of the ink, the bronze phenomenon occurred, and besides, that when the $d_{75}$ value was more than 10.60 nm and the content of the coloring material was more than 0.5 mass %, the bronze phenomenon occurred.

In each of the above case, it has been found that when the amine compound represented by the general formula (II) is included in the ink, the bronze phenomenon is prevented from occurring and high-environmental gas resistance is developed.

A molecular density in a solution must be kept constant in order to measure the d value by a small-angle X-ray scattering method. Therefore, the d value is preferably measured by using ink with its coloring material concentration kept constant. In the present invention, ink was diluted with purified water so as for the coloring material content (mass %) to be 0.5 mass % with respect to the total mass of the ink, and the scattering angle profile of the diluted ink was measured. The fact that the coloring material content in the ink is 0.5 mass % can be examined on the basis of the fact that the absorbance of the ink diluted 150 times with purified water is in the range of 1.15 to 1.30. The conditions under which the absorbance is measured are as follows.

Spectrophotometer: Self-recording spectrophotometer (trade name: U-3300; manufactured by Hitachi, Ltd.)

Measurement cell: 1 cm quartz cell

Sampling interval: 0.1 nm

Scanning rate: 30 nm/min

Number of measurements: Measurement is performed five times to take the average value of the five measurements.

The aggregation properties of the coloring material described above has a correlation also with the maximum absorption wavelength (λmax) in an absorption spectrum. Ink having higher molecular aggregation properties (a higher $d_{75}$ value) tends to have smaller λmax. Therefore, a coloring material can be evaluated for its aggregation properties by means of λmax having a correlation with the $d_{75}$ value. In this case, when the λmax in the ink diluted 2,000 times with pure water is 612.0 nm or less and the coloring material content exceeds 3.0 mass % based on the total mass of the ink, the bronze phenomenon may occur, and when the λmax is less than 608.0 nm and the coloring material content exceeds 0.5 mass %, the bronze phenomenon may occur. Here, the conditions for measuring the maximum absorption wavelength are the same as the aforementioned conditions for measuring the absorbance.

In both of the above cases, it has been found that when the amine compound represented by the general formula (II) is included in the ink, the bronze phenomenon is prevented from occurring and high environmental gas resistance is developed.

(Method of Testing Coloring Material)

Exemplified Compound 1 (the compound represented by the general formula (III) or the salt thereof), which is an example of the coloring material used in the present invention, can be tested by the following methods (1) to (3) each of which involves the use of high performance liquid chromatography (HPLC).

(1) Retention time of the peak (2) Maximum absorption wavelength in the peak of (1)

(3) M/Z (posi) of mass spectrum in the peak of (1)

Analysis conditions for high performance liquid chromatography are as shown below. An ink solution diluted 50 times with pure water is analyzed by means of high performance liquid chromatography under the following conditions to measure the retention time of a main peak and the maximum absorption wavelength of a peak.

Column: Symmetry C18 2.1 mm × 150 mm
Column temperature: 40° C.
Flow rate: 0.2 ml/min
PDA: 210 nm to 700 nm Mobile phase and gradient condition: Table 3

TABLE 3

|  | 0-15 min | 15-30 min |
|---|---|---|
| A Water | 87.5% → 0% | 0% |
| B Acetonitrile | 10% → 97.5% | 97.5% |
| C 200-mmol/l aqueous solution of ammonium acetate | 2.5% | 2.5% |

In addition, analysis conditions for a mass spectrum are as shown below. The mass spectrum of the resultant peak is measured under the following conditions, and the M/Z (posi) is measured.

| Ionization method | | |
|---|---|---|
| ESI | Capillary voltage | 3.1 kV |
|  | Desolvating gas | 300° C. |
|  | Ion source temperature | 120° C. |

Detector posi 40 V 500-2,000 amu/0.9 sec

Table 4 shows the values of the retention time, maximum absorption wavelength, and M/Z of Exemplified Compound 1. When a coloring material has values shown in Table 4, the coloring material can be judged to be usable in the present invention. In the coloring material used in the present invention, the peak ratio of the mass spectrum obtained from a peak of high performance liquid chromatography (HPLC) varies depending on a mixing ratio of isomers different from each other in the number, kinds, and substitution positions of substituents in the coloring material, but the peak of the M/Z described in Table 4 below is characterized in that it is always detected. Therefore, the present method of testing a coloring material is effective in examining whether ink contains the coloring material used in the present invention.

TABLE 4

| Retention time (min) | Maximum absorption wavelength (nm) | M/Z(Posi) |
|---|---|---|
| 6.9-7.2 | 600-620 | 1670-1672 |

(Amine compound represented by the general formula (II))

The amine compound represented by the following general formula (II) is indispensably contained in the ink of the present invention.

    General formula (II)

(In the general formula (II), $R_1$, $R_2$ and $R_3$ each independently represent a hydrogen atom, an alkyl group, a lower hydroxyalkyl group, a cyclohexyl group, a mono- or di-alkylaminoalkyl group, a lower cyanoalkyl group, or a phenyl group which may be substituted, provided that all of $R_1$, $R_2$ and $R_3$ are not simultaneously a hydrogen atom).

Where the amine compound of the above general formula (II) is included in the ink, in particular, the effect of preventing the bronze phenomenon from occurring is remarkably exhibited. The reason therefor is considered to be that when a water-soluble organic solvent evaporates on a recording medium on which the ink is applied, the following phenomenon occurs. In the case where the amine compound of the general formula (II) is in existence, an unshared electron pair of a nitrogen atom in the amine compound interacts with a primary aggregate of a phthalocyanine-based coloring material. Since the amine compound existing around the aggregate causes steric hindrance, it is difficult to bring about secondary aggregation.

It is considered that since a nitrogen atom having an unshared electron pair can easily approach a primary aggregate, the interaction between an amine compound and a primary aggregate most effectively occurs when using a primary amine as the amine compound, and the effectiveness is followed by a secondary amine and a tertiary amine in this order. In addition, in the case where an amine compound interacts with a primary aggregate, if the organic group of the amine compound is bulky, it is difficult for primary aggregates to approach to each other, and hence secondary aggregation is considered to be difficult to bring about. Furthermore, when the amine compound is high in boiling temperature, preferably solid at normal temperature, the organic compound easily stays close to the aggregate without evaporating on a recording medium, and it is difficult for secondary aggregation to occur.

As a result of exhaustive researches conducted by the present inventors based on the above findings, it has been found that when using the compound of the general formula (I) or the salt thereof which is a phthalocyanine-based coloring material having high aggregation properties, and the amine compound of the general formula (II) in combination, the secondary aggregation of the coloring material on a recording medium can be surely prevented, and high resistance to environmental gas is developed.

Particularly among the amine compounds, tris(hydroxymethyl)aminomethane is a primary amine, has a bulky tris-hydroxymathyl group in its molecular structure, and is solid at normal temperature. Therefore, from the afore-mentioned viewpoint, the bronze phenomenon resulting from the compound of the general formula (II) or the salt thereof can be effectively prevented.

The content of the amine compound represented by the general formula (II) is preferably 0.1 mass % or more and 10.0 mass % or less based on the total mass of the ink. If the amine compound content is less than 0.1 mass %, the effect of preventing the bronze phenomenon may be insufficient in some cases, and on the other hand, if the amine compound content is more than 10 mass % the ejection properties of the ink may be lowered depending on ink jet recording apparatuses. In addition, the content of the amine compound represented by the general formula (II) is preferably 5.0 mass % or more with respect to the content of the coloring material which is the compound represented by the general formula (I) or the salt thereof. The reason therefore is that if the rate of the amine compound content is less than 5.0 mass %, the effect of preventing the bronze phenomenon from occurring may not be sufficiently exhibited. Furthermore, the content of the compound represented by the general formula (II) is preferably 1,000 mass % or less with respect to the content of the coloring material which is the compound represented by the general formula (I) or the salt thereof. The reason therefore is that if the rate of the amine compound content is more than 1,000 mass %, the ejection properties of the ink may be lowered depending on ink jet recording apparatuses. When the amine compound represented by the general formula (II) is excessively included, the bronze phenomenon can be prevented from occurring, but the viscosity of the ink may come to be too high, thus affecting the ejection properties of the ink in some cases.

(Aqueous Medium)

An aqueous medium as well as the amine compound of the general formula (II) is added to the ink composition of the present invention to exhibit an effect, and inasmuch as not impairing the effect of the present invention and not deviating form the objects of the present invention, water or an aqueous medium which is a mixed solvent of water and any one of various water-soluble organic solvents may be used.

There is no particular limitation concerning the water-soluble organic solvent as long as they are water-soluble, and preferable examples thereof include: an alkyl alcohol having 1 to 4 carbon atoms such as ethanol, isopropanol, n-butanol, isobutanol, 2-butanol, or 3-butanol; a carboxylic acid amide such as N,N-dimethylformamide or N,N-dimethylacetamide; a ketone or a keto alcohol such as acetone, methyl ethyl ketone, or 2-methyl-2-hydroxypentan-4-one; a cyclic ether such as tetrahydrofuran or dioxane; a polyhydric alcohol such as glycerin, ethylene glycol, diethylene glycol, triethylene glycol, tetraethylene glycol, 1,2 or 1,3-propylene glycol, 1,2 or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, an acetylene glycol derivative, or trimethylolpropane; an alkyl ether of a polyhydric alcohol such as ethylene glycol monomethyl (or ethyl) ether, diethylene glycol monomethyl (or ethyl) ether, or triethylene glycol monoethyl (or butyl) ether; a heterocyclic compound such as 2-pyrrolidone, N-methyl-2-pyrrolidone, 1,3-dimethyl-2-imidazolidinone, or N-methylmorpholine; a sulfur-containing compound such as dimethyl sulfoxide; and urea and a urea derivative. Each of those water-soluble organic solvents may be used alone, or two or more of them may be used as a mixture.

The content of such a water-soluble organic solvent is preferably 5.0 mass % to 90.0 mass %, or more preferably 10.0 mass % to 50.0 mass % with respect to the total mass of ink. The reason therefore is as follows. If the content is smaller than the range, reliability for ejection properties, etc. may lower when the water-soluble organic solvent is used for ink jet ink, on the other hand, if the content is larger than the range, insufficient ink supply due to an increase in viscosity of ink may occur.

Deionized water (ion-exchange water) is preferably used as water. The water content is preferably 10.0 mass % to 90.0 mass % with respect to the total mass of ink.

In the present invention, among the above-described water-soluble organic solvents, 2-pyrrolidone, polyethylene glycol (molecular weight: 200 or more), and alkyl ethers of polyhydric alcohols such as triethylene glycol monoethyl ether are preferable because they exhibit the effect of suppressing the bronze phenomenon when they are used in combination with the compound represented by the formula (II) or the salt thereof. In particular, 2-pyrrolidone is preferable because it is particularly effective in suppressing the occurrence of the bronze phenomenon when it is used in combination with the compound represented by the general formula (I) or the salt thereof. The content (mass %) of 2-pyrrolidone in ink is preferably 50.0% or more with respect to the coloring material content (mass %) in order to obtain the effect by incorporating 2-pyrrolidone into the ink.

The mechanism for suppressing the occurrence of the bronze phenomenon by those specific water-soluble organic solvents is unclear, but is estimated to be as follows. The $d_{75}$ value of ink obtained by a small-angle X-ray scattering method does not change depending on the presence or absence of those specific water-soluble organic solvents in the ink. In view of this, those specific water-soluble organic solvents do not change the aggregation properties of a coloring material in the ink, and are capable of suppressing the aggregation of molecular aggregates of the coloring material on the recording medium. The content (mass %) of those specific water-soluble organic solvents in ink is preferably 50.0% or more with respect to the coloring material content (mass %) in order for the effect to be exhibited by incorporating those specific water-soluble organic solvents into the ink.

(Other Additive)

In addition, in the present invention, various additives such as a surfactant, a pH adjustor, a rust inhibitor, an antiseptic, a mildew proofing agent, a chelating agent, a UV absorber, a viscosity modifier, a defoaming agent, and a water-soluble polymer may be incorporated as required.

When the ph of ink is low, the solubility of the compound of the formula (I) in the ink is reduced and the aggregation is apt to occur. Accordingly, if the pH of ink is high, the aggregation is suppressed, and it comes to be difficult for the bronze phenomenon to occur. Therefore, the pH of ink is preferably in the range of from 6.0 to 11.0. Additionally, in order to particularly effectively suppress the bronze phenomenon, it is preferred that the pH of ink is 9.0 or more.

Any substance can be used as a pH adjustor as long as the substance is capable of adjusting the pH of ink to fall within the range of 6.0 to 11.0. Examples of such substance include: alcoholamine compounds such as diethanolamine, triethanolamine, and isopropanolamine; hydroxides of alkali metals such as lithium hydroxide and potassium hydroxide; ammonium hydroxide; and carbonates of alkali metals such as lithium carbonate, sodium carbonate, and potassium carbonate. Of those, alcoholamine compounds such as diethanolamine, triethanolamine, and isopropanolamine, and carbonates of alkali metals such as lithium carbonate, sodium carbonate, and potassium carbonate are preferable because each of them has the effect of suppressing the occurrence of the bronze phenomenon.

Specific examples of the surfactant include an anionic surfactant, an ampholytic surfactant, a cationic surfactant, and a nonionic surfactant.

Specific examples of the anionic surfactant include: an alkyl sulfocarboxylate; an α-olefin sulfonate; a polyoxyethylene alkyl ether acetate; N-acylamino acid or a salt thereof; an N-acylmethyltaurine salt; an alkyl sulfonate polyoxyalkyl ether sulfonate; an alkyl sulfonate polyoxyethylene alkyl ether phosphate; resin acid soap; a castor oil sulfonate; lauryl alcohol sulfonate; an alkyl phenol phosphate; an alkyl phosphate; an alkyl allyl sulfonate; a diethyl sulfosuccinate; and a diethyl hexyl sulfosuccinate dioctyl sulfosuccinate.

Specific examples of the cationic surfactant include a 2-vinylpyridine derivative and a poly4-vinylpyridine derivative. Examples of the ampholytic surfactant include lauryl dimethyl aminoacetic acid betaine, 2-alkyl-N-carboxymethyl-N-hydroxyethylimidazolinium betaine, coconut oil fatty amide propyl dimethyl aminoacetic acid betaine, polyoctyl polyamino ethyl glycin, and other imidazoline derivatives.

Specific examples of the nonionic surfactant include: ethers such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ether, and polyoxyaralkyl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; and acetylene glycol-based nonionic surfactants such as 2,4,7,9-tetramethyl-5-decyne-4,7-diol, 3,6-dimethyl-4-octyne-3,6-diol, and 3,5-dimethyl-1-hexyen-3-ol (for-example, Acetylenol EH manufactured by Kawaken Fine Chemicals Co., Ltd. and Surfynol 104, 82, and 465, and Olfin STG manufactured by Nissin Chemical Industry Co., Ltd.).

Specific examples of the antiseptic and the mildew proofing agent include organic sulfur-based, organic nitrogen sulfur-based, organic halogen-based, haloallylsulfone-based, iodopropagil-based, N-haloalkylthio-based, benzothiazole-based, nithochirile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiadiazine-based, anilide-based, adamantane-based, dithiocarbamate-based, brominated indanone-based, benzyl bromoacetate-based, and inorganic salt-based compounds.

An example of the organic halogen-based compound includes pentachlorophenol sodium. An example of the pyridine oxide-based compound includes 2-pyridinethiolloxide sodium. An example of the inorganic salt-based compound includes soda acetic anhydride. Examples of the isothliazoline-based compound include: 1,2-benzoisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, and 5-chloro-2-methyl-4-isothiazolin-3-one calcium chloride. Other specific examples of the antiseptic and the mildew proofing agent include soda sorbate sodium benzoate such as Proxel GXL (S) and Proxel XL-2 (S) manufactured by Avecia.

Examples of the chelating agent include sodium citrate, sodium ethylenediamine tetraacetate, sodium dinitrotriacetate, sodium hydroxyethylethylenediamine triacetate, sodium diethylenetriamine pentaacetate, and sodium uramil diacetate.

Examples of the rust inhibitor include an acid sulfite, sodium thiosulfate, ammonium thioglycolate, diisopropylammonium nitrite, pentaerythritol tetranitrate, and dicyclohexylammonium nitrite.

Examples of the UV absorber include a benzophenone-based compound, a benzotriazole-based compound, a cinnamic acid-based compound, a triazine-based compound, a stilbene-based compound, or compounds that absorb ultraviolet light to emit fluorescence typified by a benzoxazole-based compound, so-called fluorescent whitening agents.

Examples of the viscosity modifier include water-soluble polymer compounds in addition to water-soluble organic solvents, and examples of the water-soluble polymer compounds include polyvinyl alcohol, a cellulose derivative, polyamine, and polyimine.

A fluorine-based or silicone-based compound is used as the defoaming agent as required.

<Recording Medium>

Any recording medium can be used for forming images by means of the ink of the present invention as long as recording is performed by applying the ink to the recording medium.

The present invention is applicable to a recording medium in which a coloring material such as a pigment or a dye is adsorbed to fine particles forming a porous structure in an ink-receiving layer and an image is formed from at least the fine particles with the coloring material adsorbed thereto, and is particularly suitable for the case where an ink jet method is used. Such an ink jet recording medium is preferably of a so-called absorption type in which ink is absorbed by a gap formed in an ink-receiving layer on a support.

An absorption type ink-receiving layer is constituted as a porous layer mainly composed of fine particles and containing a binder and any other additive as required. Specific examples of the fine particles include: inorganic pigments such as silica, clay, talc, calcium carbonate, kaolin, aluminum oxide (for example, alumina or alumina hydrate), diatomaceous earth, titanium oxide, hydrotalcite, and zinc oxide; and organic pigments such as a urea formalin resin, an ethylene resin, and a styrene resin. One or more kinds of them may be used.

Examples of a binder that is suitably used include a water-soluble polymer and latex. For example, the following may be cited: polyvinyl alcohol or a modified product thereof; starch or a modified product thereof; gelatin or a modified product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them may be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having an ink-receiving layer formed thereon which is mainly composed of fine particles having an average particle size of 1 μm or less is preferably used in the present invention. Specific examples of the fine particles include silica fine particles and aluminum oxide fine particles. Preferable silica fine particles are silica fine particles typified by colloidal silica. Colloidal silica, which itself is available in the market, is particularly preferably what is described in JP 2803134 B or JP 2881847 B. Preferable aluminum oxide fine particles are alumina hydrate fine particles and the like. An alumina hydrate represented by the following general formula may be exemplified as one example of such alumina hydrate fine particles.

$$Al_2O_{3-n}(OH)_{2n} \cdot mH_2O$$

(In the formula, n represents an integer of 1, 2, or 3, and m represents a value of 0 to 10, or preferably 0 to 5; provided, however, that m and n are not simultaneously 0. m may be or may not be an integer because $mH_2O$ also represents an aqueous phase that can desorb and is not involved in the formation of an $mH_2O$ crystal lattice in many cases. In addition, when heating such kind of material, m may reach 0.)

An alumina hydrate can be produced by a conventionally known method such as: the hydrolysis of aluminum alkoxide or sodium aluminate described in U.S. Pat. Nos. 4,242,271 or 4,202,870; or a method involving adding an aqueous solution of sodium sulfate, aluminum chloride, or the like to an aqueous solution of sodium aluminate or the like to perform neutralization described in JP 57-44605 B.

The recording medium preferably has a support for supporting the above-described ink-receiving layer. Any support may be use without any particular limitation as long as its ink-receiving layer can be formed of the above-described porous fine particles and it provides rigidity which enables it to be conveyed by a conveying mechanism of an ink jet printer or the like. Specific examples thereof include: a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer in which a white pigment or the like is added.

<Ink Jet Recording Method>

The ink according to the present invention is particularly suitably used for an ink jet recording method including the step of ejecting the ink by an ink jet method. Examples of the ink jet recording method include a recording method involving applying mechanical energy to ink to eject the ink and a recording method involving applying thermal energy to ink to eject the ink. An ink jet recording method involving the use of thermal energy is particularly preferably used in the present invention.

<Ink Cartridge>

An example of an ink cartridge suitable for performing recording by using the ink according to the present invention includes an ink cartridge including an ink storage portion for storing the ink.

<Recording Unit>

An example of a recording unit suitable for performing recording by using the ink according to the present invention includes a recording unit including an ink storage portion for storing the ink and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 4:
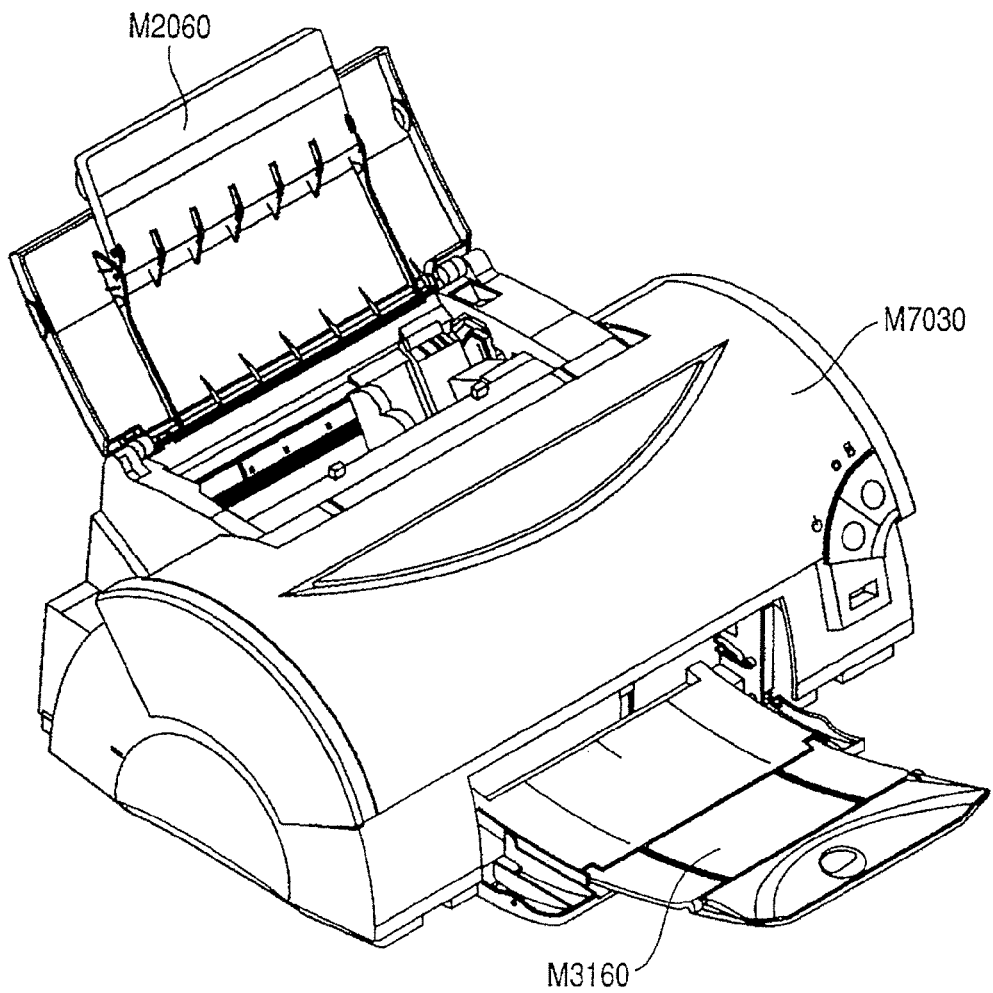
FIG. 4 is a perspective view of a recording apparatus.
Figure 5:
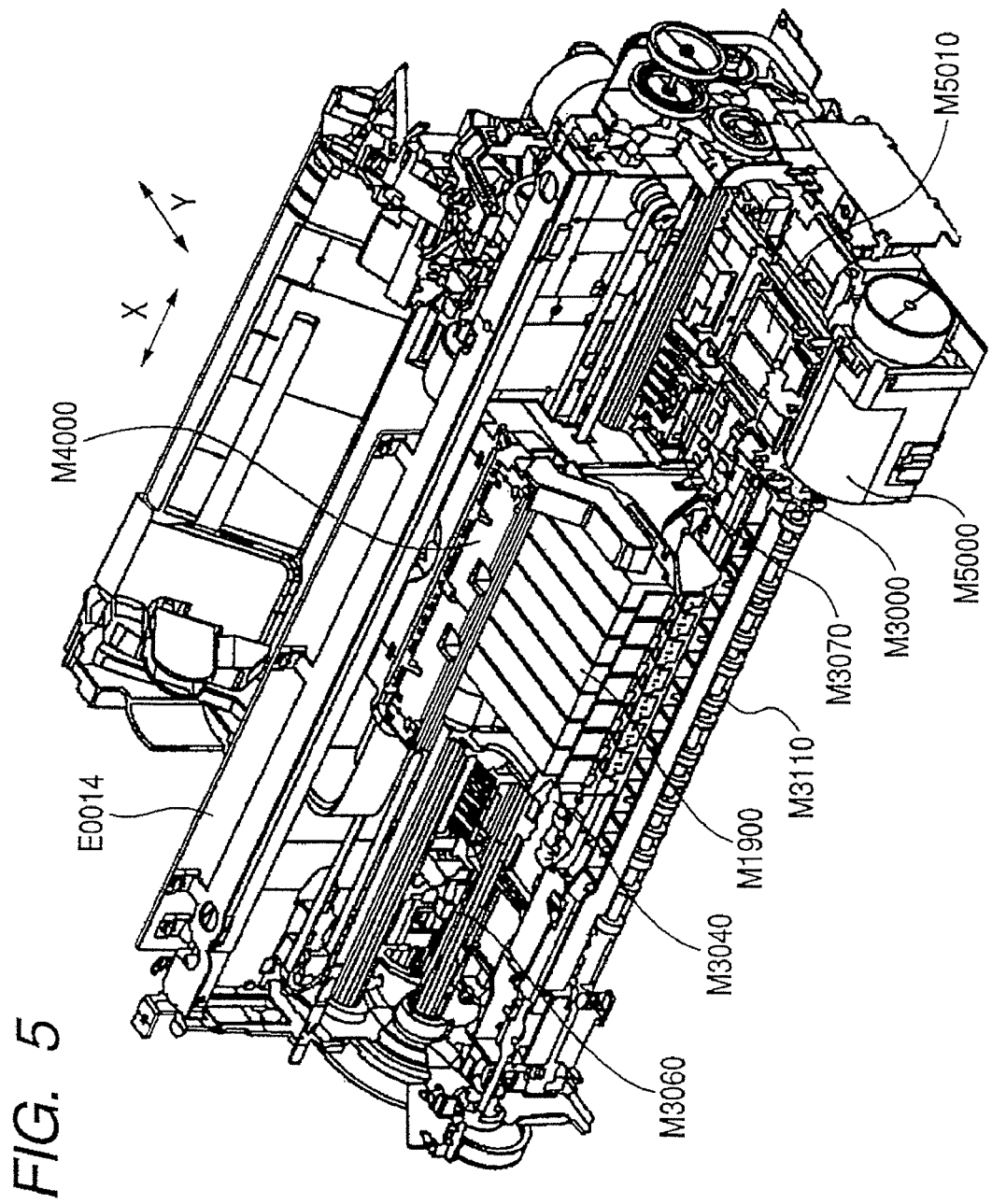
FIG. 5 is a perspective view of a mechanism portion of the recording apparatus.
Figure 6:
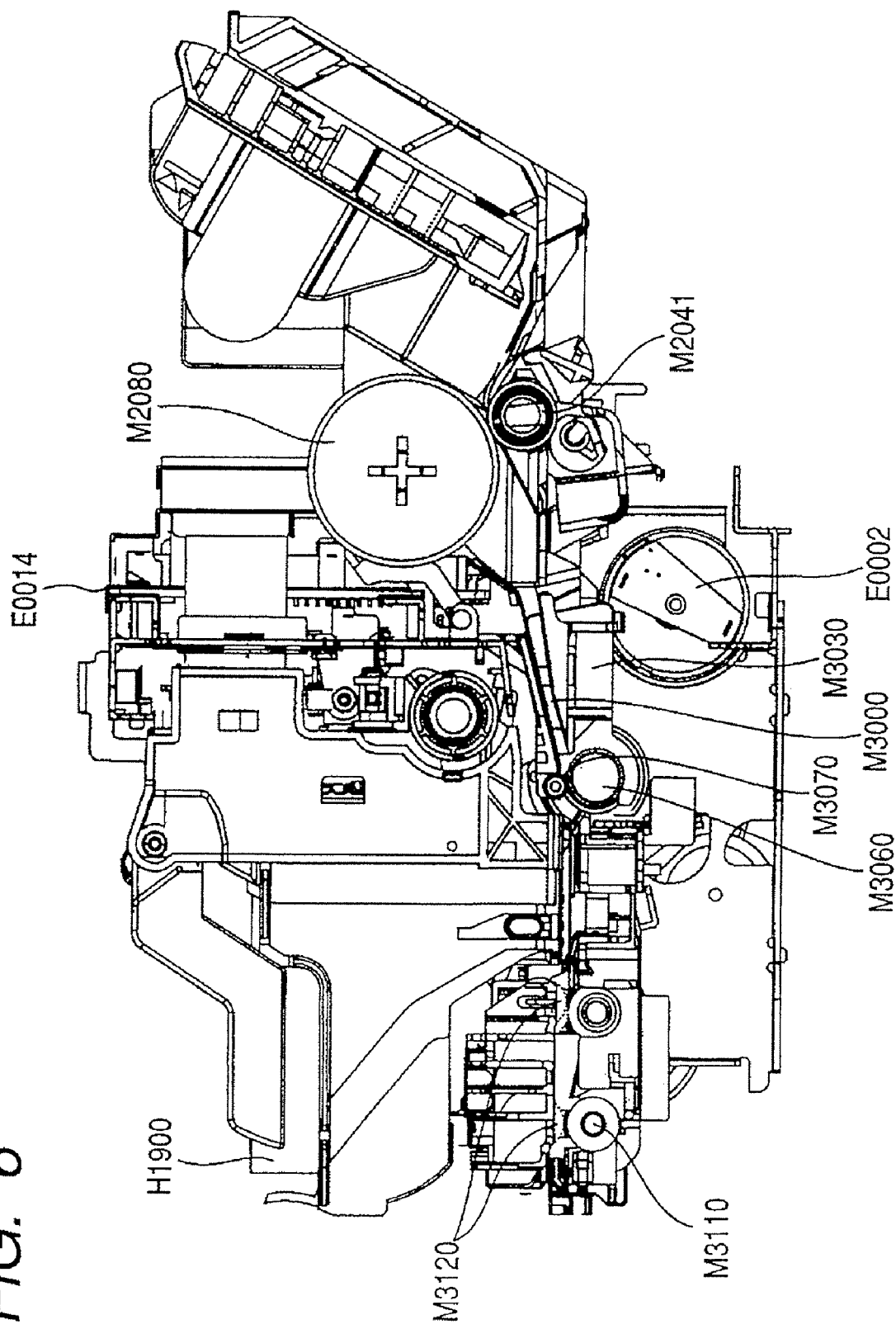
FIG. 6 is a sectional view of the recording apparatus.

FIG. 4 is a perspective view of a recording apparatus. FIGS. 5 and 6 are views for explaining the internal mechanism of a recording apparatus main body. FIG. 5 is a perspective view seen from an upper right portion, and FIG. 6 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 7) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described below. The head cartridge H1000 includes the recording head H1001, means for mounting ink tanks H1900, and means for supplying ink from the ink tanks H1900 to the recording head, and is detachably mounted on the carriage M4000.

Figure 7:
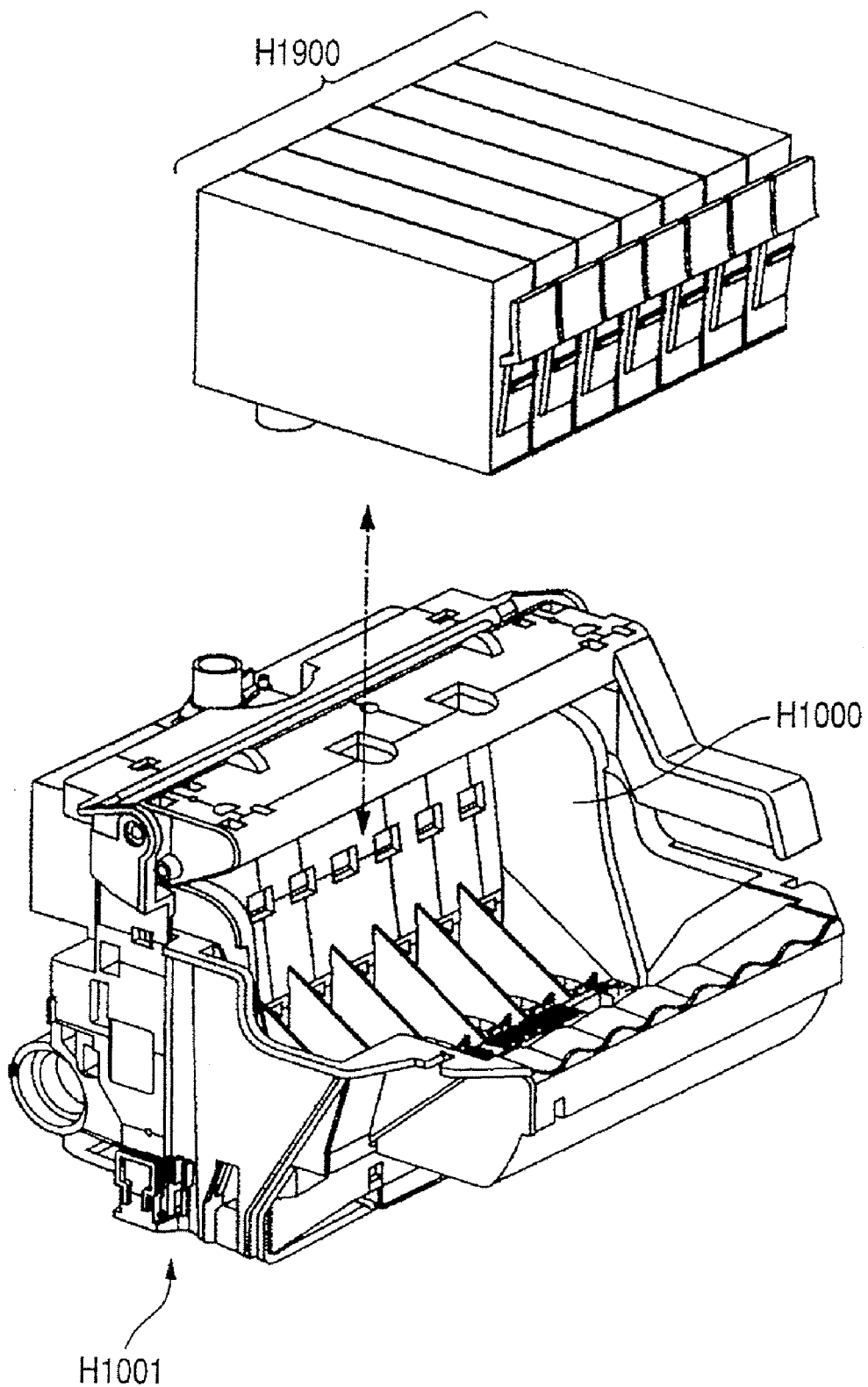
FIG. 7 is a perspective view showing a state in which an ink tank is mounted on a head cartridge.

FIG. 7 shows how the ink tanks H1900 are mounted on the head cartridge H1000. The recording apparatus forms images by means of yellow, magenta, cyan, black, pale magenta, pale cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 8:
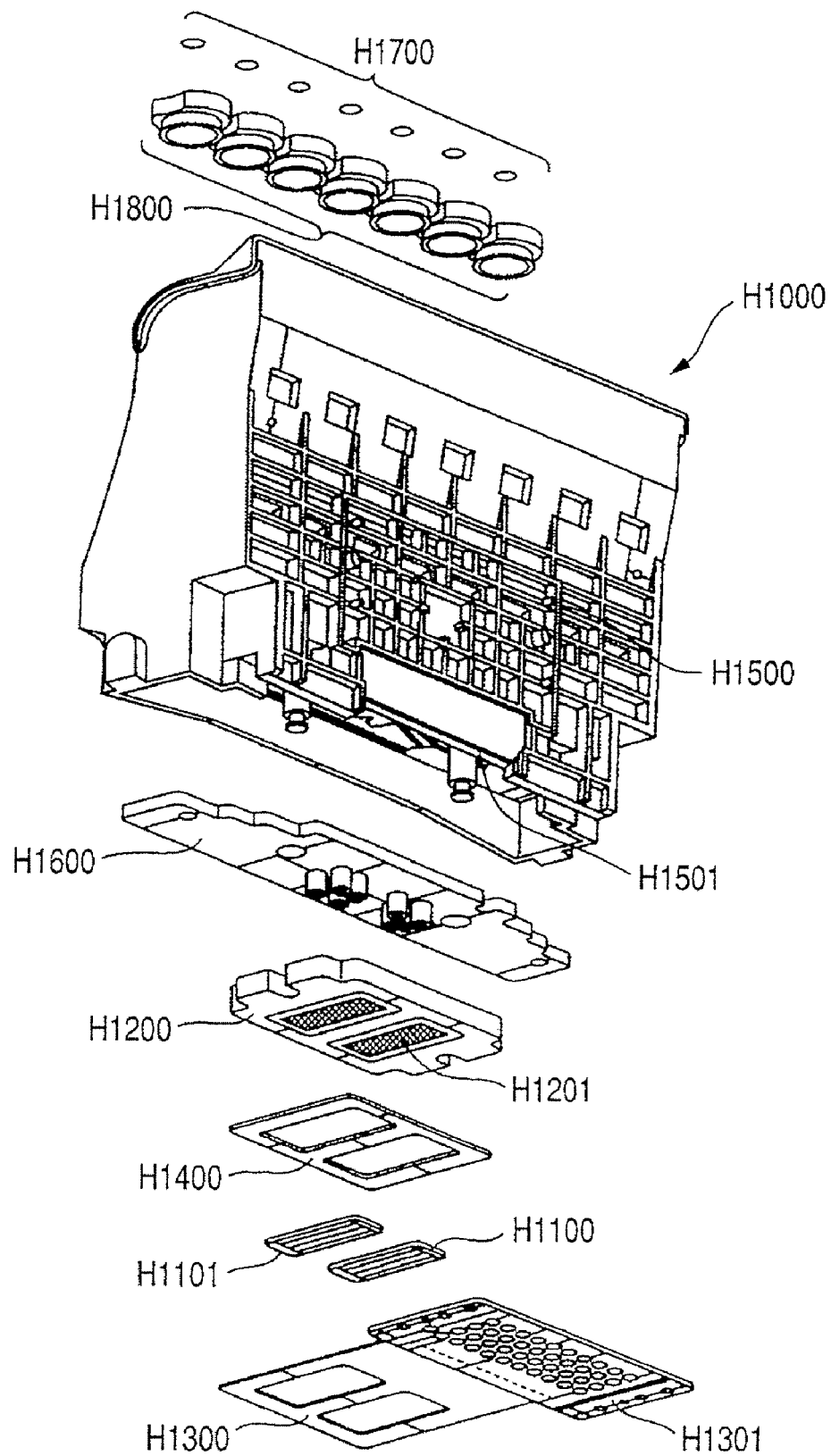
FIG. 8 is an exploded perspective view of the head cartridge.

FIG. 8 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 9:
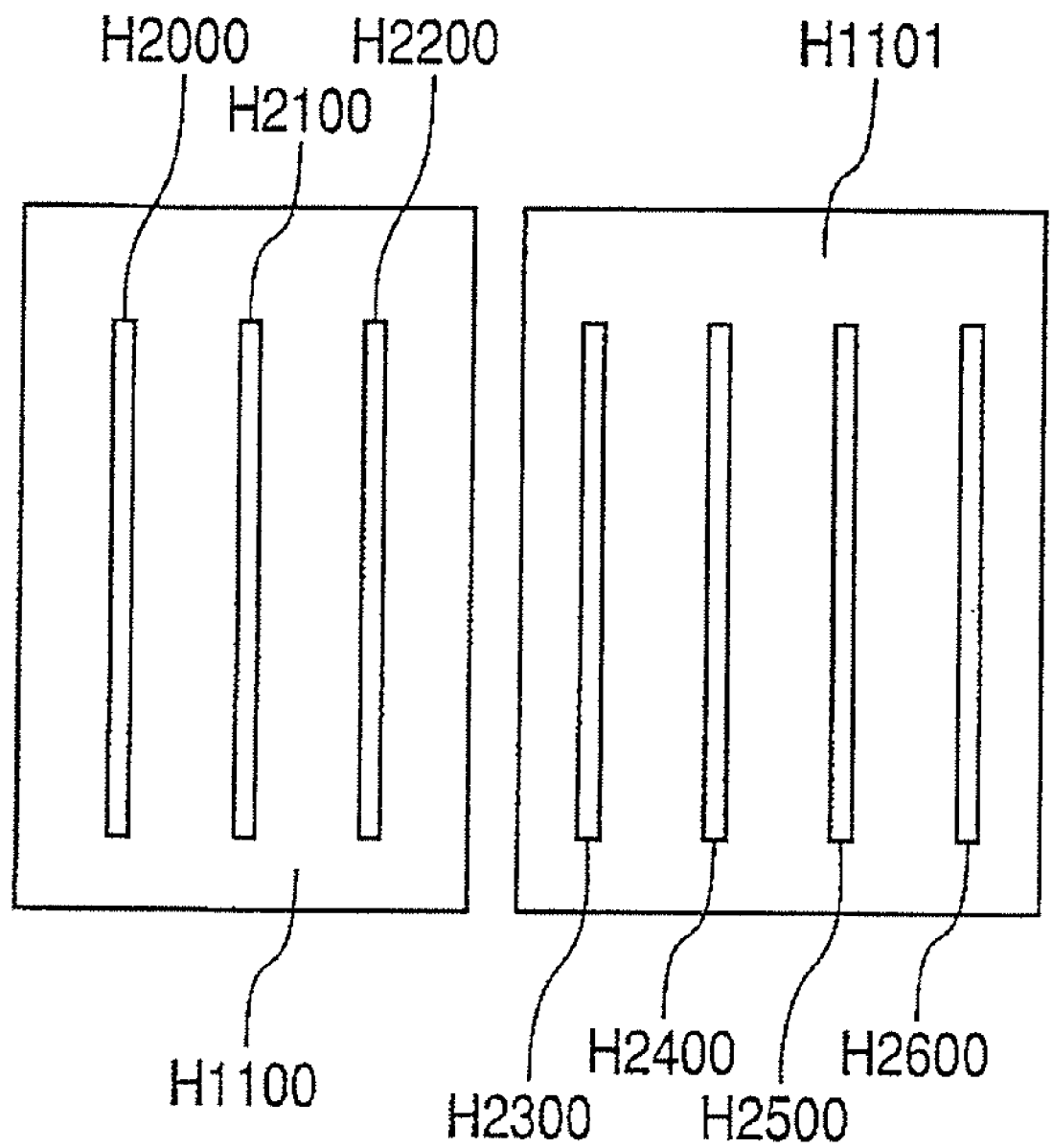
FIG. 9 is a front view showing a recording element substrate in the head cartridge.

FIG. 9 is an enlarged front view for explaining the constitution of each of the first recording element substrate H1100 and the second recording element substrate H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 $\mu m^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the, second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. Nos. 4,723,129 and 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble eject the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on-demand ink jet recording head may be cited, including: a nozzle forming substrate having multiple nozzles; pressure generating means arranged so as to be opposite to the nozzles and composed of a piezoelectric material and a conductive material.; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples.

However, the present invention is not limited to the following examples unless the examples depart from the gist of the present invention. Unless otherwise specified, the term "part(s)" of each ink component in examples and comparative examples represents "part(s) by mass".

<Synthesis of Coloring Material>

(1) Synthesis of Tetrasodium Copper Phthalocyanine Tetrasulfonate (Compound (2))

Compound (2)

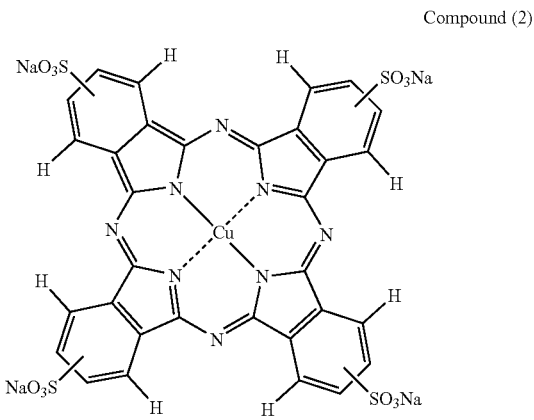

Sulfolane, monosodium 4-sulfophthalate, ammonium chloride, urea, ammonium molybdate, and copper (II) chloride were mixed, stirred, and washed with methanol. After that, water was added to the resultant product, and an aqueous solution of sodium hydroxide was used to adjust the pH of the solution to 11. An aqueous solution of hydrochloric acid was added to the resultant solution under stirring, and then sodium chloride was gradually added to deposit crystals. The resultant crystals was filtered out and washed with a 20% aqueous solution of sodium chloride, and then methanol was added. The deposited crystals were filtered out, washed with a 70% aqueous solution of methanol, and dried to yield tetrasodium copper phthalocyanine tetrasulfonate (Compound (2)) as blue crystals.

(2) Synthesis of Copper Phthalocyanine Tetrasulfonic Chloride (Compound (3))

Compound (3)

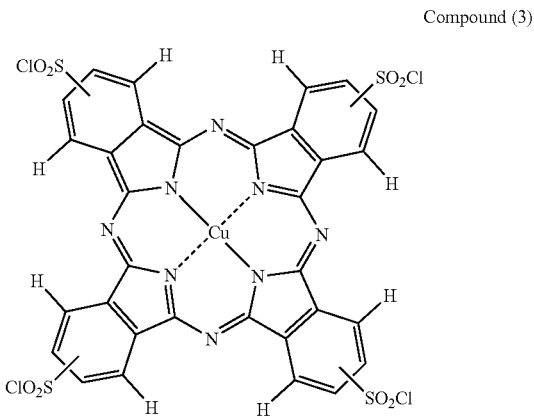

Tetrasodium copper phthalocyanine tetrasulfonate (Compound (2)) thus prepared was gradually added to chlorosulfonic acid, and then thionyl chloride was added dropwise to perform reaction. After that, the reaction solution was cooled, and the deposited crystal was filtered to yield a wet cake of copper phthalocyanine tetrasulfonic chloride.

(3) Synthesis of the Following Compound (4)

A compound (4) is a compound represented by the general formula (V) wherein Y represents an amino group and $R_1$ and $R_2$ each represent a sulfonic group substituted at the 2 or 5 position.

Compound (4)

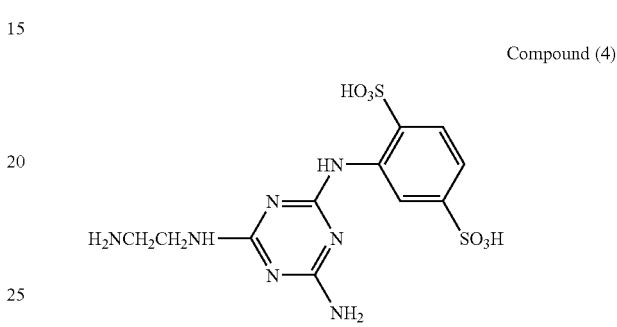

Lipal OH, cyanuric chloride, and monosodium aniline-2,5-disulfonate were added in an ice water, and were allowed to react while an aqueous solution of sodium hydroxide was added. Next, an aqueous solution of sodium hydroxide was added to the reaction solution to adjust the pH of the reaction solution to 10. 28% ammonia water and ethylenediamine were added to the reaction solution to perform reaction. Sodium chloride and concentrated hydrochloric acid were added to the resultant reaction solution to deposit crystals. The deposited crystals were filtered and fractionated, and was washed with a 20% aqueous solution of sodium chloride to prepare a wet cake. Methanol and water were added to the resultant wet cake, and the whole was filtered, washed with methanol, and dried to yield the compound (4).

(4) Synthesis of Coloring Materials A to E

The wet cake of copper phthalocyanine tetrasulfonic chloride (Compound (3)) synthesized in the above (2) was added to an ice water, and the whole was stirred to prepare a suspension. Ammonia water and the compound (4) synthesized in (3) were added to the suspension to perform reaction. Water and sodium chloride were added to the mixture to deposited crystals. The resultant crystals was filtered, washed with an aqueous solution of sodium chloride, and filtered again, washed, and dried to yield a coloring material A as blue crystals. In view of the above reaction, the compound is estimated to be a coloring material which is a compound represented by Exemplified Compound 1 and has the average numbers of substituents in the general formula (I) of l=0.9 to 1.4, m=1.6 to 2.1, and n=2.0 to 2.5.

Coloring materials B to E which were compounds each represented by Exemplified Compound 1 and were different from one another in the average numbers of substituents in the general formula (I) were synthesized in the same synthesis procedure as described above. Table 5 below shows the average number of substituents in each of the coloring materials A to E.

TABLE 5

| Coloring material | l | m | n |
|---|---|---|---|
| A | 0.9-1.4 | 1.6-2.1 | 2.0-2.5 |
| B | 0 | 1.5-2.0 | 2.0-2.5 |
| C | 0 | 1.4-2.4 | 1.6-2.6 |
| D | 0 | 1.5-2.5 | 1.5-2.5 |
| E | 0 | 2.5-3.0 | 0.5-1.0 |

<Evaluation of Bronze Resistance>

(1) Preparation of Ink

The respective components shown in Tables 6 and 7 below were mixed and sufficiently stirred. After that, the resultant product was filtered through a membrane filter having a pore size of 0.2 μm under pressure to prepare each of inks 1 to 17.

TABLE 6

| | Ink | | | | |
|---|---|---|---|---|---|
| | 1 | 2 | 3 | 4 | 5 |
| Coloring material A | 4.5 | 4.5 | | | |
| Coloring material B | | | 3.1 | 3.1 | |
| Coloring material C | | | | | 4.5 |
| Coloring material D | | | | | |
| Coloring material E | | | | | |
| Tris(hydroxymethyl)-aminomethane | | 1.0 | | 1.0 | |
| Glycerin | 10.0 | 10.0 | 10.0 | 10.0 | 10.0 |
| Ethylene glycol | 8.0 | 8.0 | 8.0 | 8.0 | 8.0 |
| Acetylenol EH (*) | 0.8 | 0.8 | 0.8 | 0.8 | 0.8 |
| Ion-exchange water | 76.7 | 75.7 | 78.1 | 77.1 | 76.7 |

| | Ink | | | |
|---|---|---|---|---|
| | 6 | 7 | 8 | 9 |
| Coloring material A | | | | |
| Coloring material B | | | | |
| Coloring material C | 4.5 | | | |
| Coloring material D | | 0.6 | 0.6 | 2.5 |
| Coloring material E | | | | |
| Tris(hydroxymethyl)-aminomethane | 1.0 | | 0.5 | |
| Glycerin | 10.0 | 10.0 | 10.0 | 10.0 |
| Ethylene glycol | 8.0 | 8.0 | 8.0 | 8.0 |
| Acetylenol EH (*) | 0.8 | 0.8 | 0.8 | 0.8 |
| Ion-exchange water | 75.7 | 80.6 | 80.1 | 78.7 |

(*)Ethylene oxide adduct of acetylene glycol (surfactant; manufactured by Kawaken Fine Chemicals Co., Ltd.)

TABLE 7

| | Ink | | | | |
|---|---|---|---|---|---|
| | 10 | 11 | 12 | 13 | 14 |
| Coloring material A | | | | | |
| Coloring material B | | | | | |
| Coloring material C | | | | | |
| Coloring material D | 2.5 | 3.1 | 3.1 | 4.1 | 4.1 |
| Coloring material E | | | | | |
| Tris(hydroxymethyl)-aminomethane | 1.0 | | 1.0 | | 0.8 |
| Glycerin | 10.0 | 10.0 | 10.0 | 10.0 | 10.0 |
| Ethylene glycol | 8.0 | 8.0 | 8.0 | 8.0 | 8.0 |
| Acetylenol EH(*) | 0.8 | 0.8 | 0.8 | 0.8 | 0.8 |
| Ion-exchange water | 77.7 | 78.1 | 77.1 | 77.1 | 76.3 |

TABLE 7-continued

| | Ink | | |
|---|---|---|---|
| | 15 | 16 | 17 |
| Coloring material A | | | |
| Coloring material B | | | |
| Coloring material C | | | |
| Coloring material D | 4.1 | | |
| Coloring material E | | 0.6 | 0.6 |
| Tris(hydroxymethyl)-aminomethane | 1.5 | | 1.2 |
| Glycerin | 10.0 | 10.0 | 10.0 |
| Ethylene glycol | 8.0 | 8.0 | 8.0 |
| Acetylenol EH(*) | 0.8 | 0.8 | 0.8 |
| Ion-exchange water | 75.6 | 80.6 | 79.4 |

(*)Ethylene oxide adduct of acetylene glycol (surfactant; manufactured by Kawaken Fine Chemicals Co., Ltd.)

(2) Measurement of $d_{75}$ Value

The scattering angle profile of each of the inks 1 to 17 (each having a coloring material concentration of 0.5 mass %) was measured by means of a small-angle X-ray scattering method. In the measurement, the inks were diluted with purified water so that their coloring material concentrations were 0.5 mass % based on the total mass of the ink, and used. The scattering angle profile was measured under the following conditions.

Apparatus: Nano Viewer (manufactured by Rigaku)
X-ray source: Cu-Kα
Output: 45 kV-60 mA Effective focal spot: 0.3 mmφ+Confocal Max-Flux Mirror
$1^{st}$ Slit: 0.5 mm, $2^{nd}$ Slit: 0.4 mm, $3^{rd}$ Slit: 0.8 mm Irradiation time: 240 min
Beam stopper: 3.0 mmΦ
Measurement method: Penetration method
Detector: Blue Imaging Plate A peak area obtained by removing a background and a 2θ value accounting for 75% or more of the entire peak area ($2θ_{75}$ value) were measured from the resultant scattering angle profile by means of an X-ray diffraction data processing soft JADE (Material Data, Inc.). The $d_{75}$ value was calculated from the $2θ_{75}$ value on the basis of the following expression (2). Table 8 shows the results.

$$d_{75} \lambda/2 \sin θ_{75} \qquad \text{Eq. (2)}$$

(3) Measurement of Maximum Absorption Wavelength (λmax)

After each of the inks 1 to 17 had been diluted 2,000 times with purified water, the maximum absorption wavelength (λmax) was measured. Table 8 shows the results. The maximum absorption wavelength (λmax) was measured under the following conditions.

Spectrophotometer: Self-recording spectrophotometer (trade name: U-3300; manufactured by Hitachi, Ltd.)
Measurement cell: 1 cm quartz cell
Sampling interval: 0.1 nm
Scanning rate: 30 nm/min
Number of measurements: Measurement was performed five times to take the average value of the five measurements.

(4) Creation of Recorded Product

Each of the inks 1 to 17 thus prepared was mounted on an ink jet recording apparatus (trade name: Pixus 950i; manufactured by CANON Inc.) to print a 13-level gradation pattern on an ink jet glossy medium (trade name: PR101; manufactured by CANON Inc.) by changing a printing duty to 5, 12, 21, 29, 35, 43, 51, 58, 66, 74, 85, 90, and 100%. Thus, a recorded product was created.

(5) Evaluation of Bronze Resistance

The printing duty at which the bronze phenomenon occurred in the 13-level gradation pattern of the recorded product thus created was visually observed to define the printing duty as the printing duty at which the bronze phenomenon occurred. In general, the bronze phenomenon is apt to occur with increasing the printing duty. In other words, the bronze phenomenon is more likely to occur where the ink has a lower printing duty at which the bronze phenomenon occurs, while the bronze phenomenon is less likely to occur where the ink has a higher printing duty at which the bronze phenomenon occurs. The criteria for the bronze resistance are as follows.

Table 8 shows the results of the evaluation.

AA: The printing duty at which the bronze phenomenon occurs is 85% or more.

A: The printing duty at which the bronze phenomenon occurs is 66% or more and less than 85%.

B: The printing duty at which the bronze phenomenon occurs is 43% or more and less than 66%.

C: The printing duty at which the bronze phenomenon occurs is 29% or more and less than 43%.

D: The printing duty at-which the bronze phenomenon occurs is less than 29%.

TABLE 8

|  | Ink | $d_{75}$ value (nm) | Maximum absorption wavelength λ max (nm) | Bronze resistance |
|---|---|---|---|---|
| Example | 2 | 7.54 | 611.4 | AA |
|  | 4 | 9.07 | 610.2 | AA |
|  | 6 | 10.55 | 608.4 | AA |
|  | 8 | 10.62 | 607.8 | AA |
|  | 10 | 10.62 | 607.8 | AA |
|  | 12 | 10.62 | 607.8 | AA |
|  | 14 | 10.62 | 607.8 | A |
|  | 15 | 10.61 | 607.9 | AA |
|  | 17 | 14.38 | 603.0 | AA |
| Comparative Example | 1 | 7.55 | 611.3 | B |
|  | 3 | 8.90 | 610.0 | B |
|  | 5 | 10.58 | 608.2 | C |
|  | 7 | 10.63 | 607.7 | D |
|  | 9 | 10.63 | 607.7 | D |
|  | 11 | 10.63 | 607.7 | D |
|  | 13 | 10.63 | 607.7 | D |
|  | 16 | 14.40 | 602.8 | D |

The present application claims the priority from each of Japanese Patent Application No. 2004-221831 filed on Jul. 29, 2004 and Japanese Patent Application No. 2005-216229 filed on Jul. 26, 2005, which are hereby incorporated by reference herein.

What is claimed is:

1. An ink jet ink comprising at least a coloring material, wherein the coloring material is a compound represented by the following general formula (I) or a salt thereof; and the ink jet ink comprises an amine compound represented by the following general formula (II):

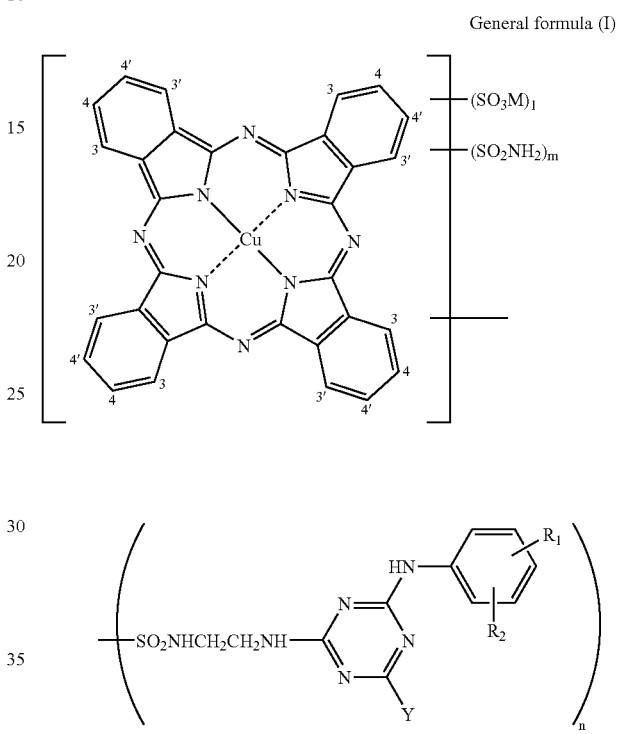

General formula (I)

wherein M represents an alkali metal or ammonium; $R_1$ and $R_2$ each independently represent a hydrogen atom, a sulfonic group, or a carboxyl group, provided that $R_1$ and $R_2$ are not simultaneously a hydrogen atom; Y represents a chlorine atom, a hydroxyl group, an amino group, or a monoalkylamino or dialkylamino group; 1 represents 0 to 2, m represents 1 to 3, and n represents 1 to 3, provided that 1 m+n=3 to 4; and positions at which substituents are present are the 4- or 4'-positions;

$NR_1R_2R_3$         General formula (II)

wherein $R_1$, $R_2$ and $R_3$ each independently represent a hydrogen atom, an alkyl group, a lower hydroxyalkyl group, a cyclohexyl group, a mono- or di-alkylaminoalkyl group, a lower cyanoalkyl group, or a phenyl group which may be substituted, provided that all of $R_1$, $R_2$ and $R_3$ are not simultaneously a hydrogen atom, and wherein the ink jet ink further comprises, as a water-soluble organic solvent, 2-pyrrolidone and polyethylene glycol, the polyethylene glycol having a molecular weight of 200 or more.

2. An ink jet ink according to claim 1, wherein the coloring material is a compound represented by the following general formula (III) or a salt thereof:

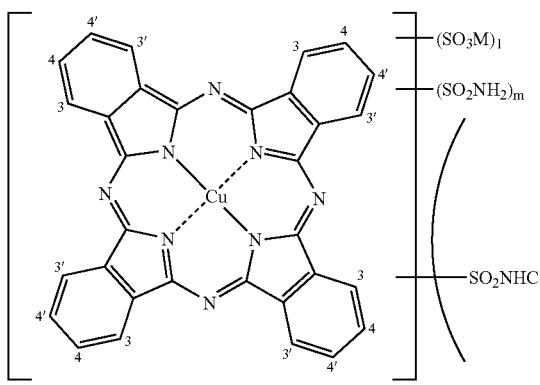
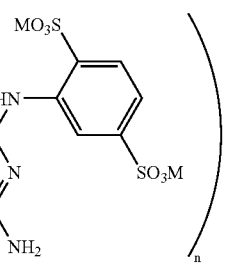

General formula (III)

wherein M represents an alkali metal or ammonium; l represents 0 to 2, m represents 1 to 3, and n represents 1 to 3, provided that l+m+n=3 to 4; and positions at which substituents are present are the 4- or 4'-positions.

3. An ink jet ink according to claim 1, wherein the amine compound represented by the general formula (II) is a primary amine compound.

4. An ink jet ink according to claim 1, wherein
   a content of the coloring material is more than 3.0 mass % based on a total mass of the ink, and
   in a dispersion distance distribution, measured by a small-angle X-ray scattering method, of molecular aggregates in the ink jet ink whose coloring material concentration is adjusted to 0.5 mass %, a dispersion distance $d_{75}$ value corresponding to 75% of the distribution is more than 7.50 nm.

5. An ink jet ink according to claim 1, wherein
   a content of the coloring material is more than 3.0 mass % based on a total mass of the ink, and
   a maximum absorption wavelength (λmax), obtained by measuring an absorbance of an ink prepared by diluting 2,000 times the ink jet ink is 608.0 nm or more and 612.0 nm or less.

6. An ink jet ink according to claim 1, wherein
   a content of the coloring material is more than 0.5 mass % and less than 3.0 mass % based on a total mass % of the ink, and
   in a dispersion distance distribution, measured by a small-angle X-ray scattering method, of molecular aggregates in the ink jet ink whose coloring material concentration is adjusted to 0.5 mass %, a dispersion distance $d_{75}$ value corresponding to 75% of the distribution is more than 10.60 nm.

7. An ink jet ink according to claim 1, wherein
   a content of the coloring material is more than 0.5 mass % and less than 3.0 mass % based on a total mass of the ink, and
   a maximum absorption wavelength (λmax), obtained by measuring an absorbance of an ink prepared by diluting 2,000 times the ink jet ink is less than 608.0 nm.

8. An ink jet recording method, comprising ejecting an ink by an ink jet method to perform recording on a recording medium, wherein the ink comprises the ink jet ink according to claim 1.

9. An ink cartridge, comprising an ink storage portion for storing ink, wherein the ink comprises the ink jet ink according to claim 1.

10. A recording unit, comprising an ink storage portion for storing ink and a recording head for ejecting the ink, wherein the ink comprises the ink jet ink according to claim 1.

11. An ink jet recording apparatus, comprising an ink storage portion for storing ink and a recording head for ejecting the ink, wherein the ink comprises the ink jet ink according to claim 1.

12. An ink jet ink according to claim 1, wherein the amine compound is a solid at normal temperature.

13. An ink jet ink according to claim 1, wherein the content of the amine compound represented by the general formula (II) is 0.1 mass % or more and 10.0 mass % or less based on the total mass of the ink.

14. An ink jet ink according to claim 1, wherein the content of 2-pyrrolidone and polyethylene glycol having a molecular weight of 200 or more is 50.0 mass % or more with respect to the coloring material content.

15. An ink jet ink according to claim 1, wherein the content of 2-pyrrolidone in the ink is 50.0 mass % or more with respect to the coloring material content.

* * * * *

UNITED STATES PATENT AND TRADEMARK OFFICE
CERTIFICATE OF CORRECTION

PATENT NO.         : 7,297,197 B2
APPLICATION NO. : 11/620766
DATED                 : November 20, 2007
INVENTOR(S)       : Masanori Jinnou et al.

It is certified that error appears in the above-identified patent and that said Letters Patent is hereby corrected as shown below:

COLUMN 10:
Line 30, "0  2  1  1  0  1" should read --0  2  1  0  0  1--.

COLUMN 11:
Line 2, "shows" should read --show--.
Line 20, "afore-mentioned" should read --aforementioned--.
Line 59, "equidistance" should read --equidistant--.

COLUMN 17:
Line 12, "form" should read --from--.
Line 17, "they are" should read --it is--.

COLUMN 18:
Line 5, "not,change" should read --not change--.

COLUMN 26:
Line 30, "in an" should read --in--.
Line 40, "was" should read --were--.

COLUMN 32:
Line 26, "ink is" should read --ink, is--.

Signed and Sealed this

Ninth Day of December, 2008

JON W. DUDAS
*Director of the United States Patent and Trademark Office*